(12) United States Patent
Abecassis

(10) Patent No.: US 9,380,282 B2
(45) Date of Patent: *Jun. 28, 2016

(54) PROVIDING ITEM INFORMATION DURING VIDEO PLAYING

(76) Inventor: Max Abecassis, Boca Raton, FL (US)

( * ) Notice: Subject to any disclaimer, the term of this patent is extended or adjusted under 35 U.S.C. 154(b) by 394 days.

This patent is subject to a terminal disclaimer.

(21) Appl. No.: 13/506,093

(22) Filed: Mar. 26, 2012

(65) Prior Publication Data

US 2013/0251337 A1    Sep. 26, 2013

(51) Int. Cl.
| | |
|---|---|
| *H04N 5/92* | (2006.01) |
| *H04N 9/87* | (2006.01) |
| *H04N 21/422* | (2011.01) |
| *H04N 21/472* | (2011.01) |
| *H04N 21/4725* | (2011.01) |
| *H04N 21/478* | (2011.01) |

(52) U.S. Cl.
CPC ......... *H04N 9/8715* (2013.01); *H04N 21/4221* (2013.01); *H04N 21/4725* (2013.01); *H04N 21/47202* (2013.01); *H04N 21/47217* (2013.01); *H04N 21/47815* (2013.01)

(58) Field of Classification Search
CPC ......... H04N 9/80; H04N 5/445; H04N 5/765; H04N 5/783; H04N 5/85; H04N 9/8205; H04N 21/00; H04N 9/8042; G11B 27/105; G11B 27/329; G11B 27/034
USPC .................................. 386/239, 241, 248, 250
See application file for complete search history.

(56) References Cited

U.S. PATENT DOCUMENTS

| | | |
|---|---|---|
| 5,434,678 A | 7/1995 | Abecassis |
| 5,596,705 A | 1/1997 | Reimer et al. |
| 5,809,471 A | 9/1998 | Brodsky |
| 6,192,340 B1 | 2/2001 | Abecassis |
| 6,208,805 B1 | 3/2001 | Abecassis |
| 6,263,505 B1 | 7/2001 | Walker et al. |
| 6,408,128 B1 | 6/2002 | Abecassis |
| 6,504,990 B1 | 1/2003 | Abecassis |
| 6,553,178 B2 | 4/2003 | Abecassis |
| 6,577,346 B1 | 6/2003 | Perlman |
| 8,402,500 B2 | 3/2013 | Walker et al. |
| 8,494,346 B2 | 7/2013 | Abecassis |
| 8,645,991 B2 | 2/2014 | McIntire et al. |
| 2003/0037068 A1* | 2/2003 | Thomas et al. ............... 707/200 |
| 2007/0250901 A1* | 10/2007 | McIntire et al. ............... 725/146 |
| 2012/0210343 A1* | 8/2012 | McCoy et al. .................. 725/25 |
| 2012/0311649 A1* | 12/2012 | Patten et al. .................... 725/97 |

OTHER PUBLICATIONS

Customplay LLC, Shopping, CustomPlay LLC Shopping website page www.customplay.com/Shopping.htm (C) 2009 Miami, FL USA.

* cited by examiner

*Primary Examiner* — William Tran

(57) ABSTRACT

An apparatus capable of, and a method comprising, the steps of: receiving, from a user during a playing of a feature-length movie, a request for item information relating to a product placement depicted within the feature-length movie; identifying a request location that is responsive to the request for item information; searching a plurality of segment definitions to identify a segment definition that is responsive to the request location, a segment definition defines, responsive to a depiction of a product placement, a beginning and an ending of a video segment within the feature-length movie; displaying item information associated with a segment definition that is responsive to the request location; receiving from the user a request for additional item information relating to a displayed item information; and enabling a display of product placement purchase information in response to the request for additional item information.

20 Claims, 10 Drawing Sheets

PROVIDING ITEM INFORMATION DURING VIDEO PLAYING

RELATED U.S. APPLCIATION DATA

This application is related to patent application Ser. No. 13/506,099 filed on Mar. 26, 2012, titled Providing Item Information Notification During Video Playing.

BACKGROUND OF THE INVENTION

1. Field of the Invention

Systems for, and methods of, providing, a user, during a playing of a video, an identification of a purchasable item that is depicted in the video. The source of the identifying information is provided by a map of the video that identifies the items that are visually depicted within the video. The map of the video may be provided by the source that provides the video or by a source other than the source that provides the video. A source of the video may be a hard format such as a DVD or Blu-ray disc, or a soft format that is broadcasted, narrow casted, delivered on-demand, streamed, and/or downloaded by a variety of means such as over-the-air broadcast, cable, satellite, cellular, internet, and any other means of receiving content/data. The means for playing the video comprises any device capable of playing video such as, for example, an optical disc player, a personal computer, a set box, a multimedia player, gaming device, and/or smart phone.

2. Description of the Related Art

DVDs and Blu-rays are "optical discs" capable of storing one full length motion picture in one of two layers on either side of the disc. Optical discs generally provide scene selection and subtitles and/or closed captioning in a plurality of languages. Among other features, some optical discs include multiple camera angles for a scene, and the capability to play one of a plurality of different content versions (e.g. a director's cut or unrated version and an "R" rated versions). Blu-rays provide more advanced features such as a search function that list keywords corresponding to noteworthy names, items, and actions, and enable a user to select a keyword to retrieve segments matching the keyword selection.

Devices capable of playing optical discs provide for, among other features, fast-forward, fast-rewind, skip-forward or skip-backwards by chapters, turn on/off subtitles, subtitle and audio language selection, camera angle selection, and optical disc menu navigation to select, for example, multiple content versions.

While the optical discs formats provide many capabilities and functions exceeding those provided by, for example, conventional-linear playing formats, many of the capabilities and functions do not fully realize the potential of a random access video playing capability that is synergistically integrated with a map of the content of the video. Optical disc playing devices do not provide a readily accessible identification of purchasable item depicted in a segment within a video. These deficiencies are not addressed by the many sources that may provide an identification of the purchasable items present in a video, including, for example, a variety of web sites, or various sources that may identify purchasable items present in a video.

BRIEF SUMMARY OF THE INVENTIONS

The present inventions relate generally to system and methods for providing a user, during playing of a segment from within a video, an identification of a purchasable item that is depicted in that segment. By contrast to the usual passive viewing of a video, or the interactive playing of a video, as in the playing of a computer game, a primary element of the "autoactive" systems and methodologies disclosed herein is the synergistic integration of a map of the content of the video with the playing of the video to satisfy the real-time informational interests of a user and to deliver a more informed and entertaining video viewing experience.

Accordingly, it is an object of the present inventions to provide, during a playing of a video, with efficient access to information that identifies the purchasable item that is depicted in a segment within a video.

It is also an object of a particular on of the present inventions to provide, during a playing of a video, an indication that item information is available for an item being currently depicted within the video.

It is also an object to associate the identification of the purchasable item with other information that may be available, internally or externally, for a selected purchasable item.

It is also an object to provide for an appropriately labeled key on a remote control device for efficient access to the purchasable item information function.

Briefly, these and other objects are accomplished by autoactive capabilities and functions provided by systems comprising, and methodologies utilizing processing, random accessing, and control software functions, integrated with video segment information, such as information that identifies items that are depicted within the video. The creation of the segment information comprises the analysis of the content of a video to define segments within the video responsive to the depiction of a significant or noteworthy item. Segments may be associated with identifying information, purchase information, additional item information, information that may be retrieved from sources other than the video, and other descriptors relating to the depiction of that item. Each of the items is associated with an image of the item from the video, preferably a close-up shot featuring the item. In one of a number of inventions disclosed herein, during playing of the video, when a user desires to obtain information on an item depicted during a playing of a video, the user activates item notification routines that display an indication that item information is available for an item being depicted; the user activates item identification routines by requesting item information relating to an item depicted within the video or in response to the a display indicating item information is available; the video is paused in response to the request for item information; a request location is identified that is responsive to the request for item information, the request location may also comprise a predetermined playing period prior to the request location; a plurality of segment definitions is searched to identify segment definitions that are responsive to the request location, a segment definition defines, responsive to a depiction of an item, a beginning and an ending of a video segment within the video, a segment definition is associated with item information; and item information associated with a responsive segment definition is displayed. If the user desires to obtain additional item information, additional item information is provided in response to the request for additional item information, the additional item information may comprises item purchase information. Following a termination of a displaying of additional item information, playing of the video is resumed at the request location.

This and other inventions, embodiments, features, advantages, and objects, are apparent in the context of the detailed description, accompanying drawings, and appended claims that follow.

BRIEF DESCRIPTION OF THE DRAWINGS

The following drawing figures, which form a part of this application, are illustrative of embodiments of the present inventions and are not meant to limit the scope of the inventions in any manner.

DETAILED DESCRIPTION OF THE INVENTIONS

Figure 1A:
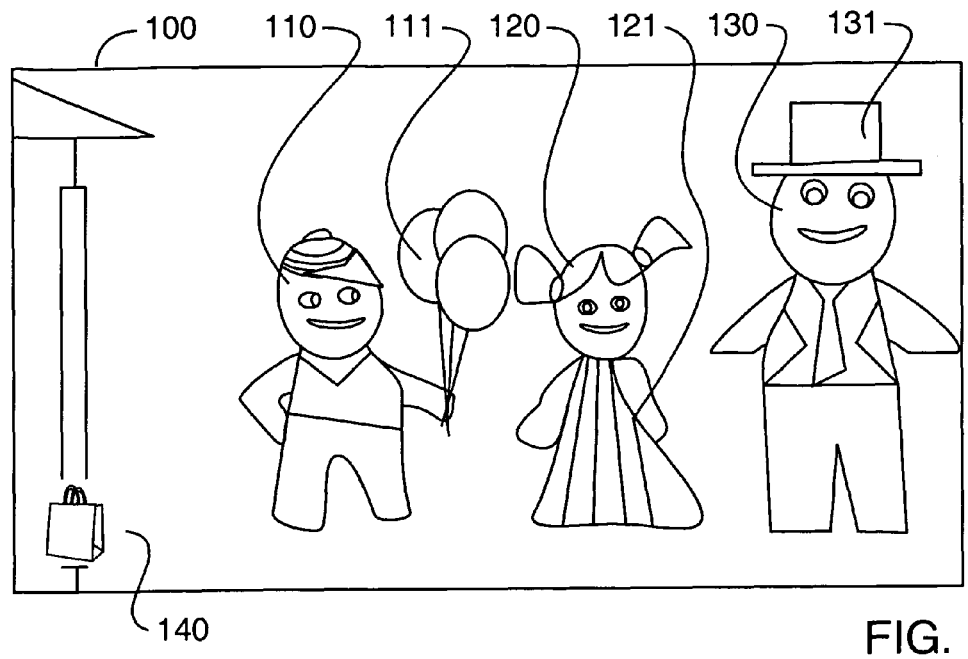
FIG. 1A is a representation of a video frame within a motion picture and the display of an indication that information is available for an item being depicted.

U.S. Pat. Nos. 5,434,678; 6,192,340; 6,208,805; 6,408,128; 6,504,990; 6,553,178; and their respective divisions are incorporated herein by reference. Where a particular detail disclosed in an incorporated reference and a detail described here may appear inconsistent, the detail disclosed in the incorporated reference should be understood as an alternative detail description.

For purposes of the present disclosure, various terms used in the art are defined as follows:

The term "associated" refers to associated, linked, related, connected, brought into relationship, joined, designated, ascribe, and/or attributed.

The term "character" refers to a role or a part in a video, and/or a participant in a video, typically displaying human-like qualities.

The term "chapter" refers to a division of a video generally defined by the author of the video. Optical discs, for example, typically have multiple chapters such as with DVDs, which often refer to a chapter as a scene.

The term "clip" refers to a segment that is smaller than a chapter and usually smaller than a scene. A clip includes one or more contiguous shots, and usually depicts the same primary characters within a location. A clip's definition is responsive to a material change in the participation of the principal characters, a material change in location, and/or a distinct change in thematic content or topic of conversation.

The term "content preferences" refers, specifically and principally, although not exclusively, to a user's preferences for the form of expression, explicitness, the absence of objectionable segments, content categories and levels, length, detail, subjects, versions, thematic content, and items. A set of content preferences also includes technical preferences and presentation preferences. In the broadest sense, the term content preferences further comprises video, programming, and subject matter preferences (collectively "programming preferences"). Programming preferences refer exclusively to a user's preferences as to specific videos (e.g. Sega's "Sherlock Holmes Consulting Detective"), types of videos (e.g. interactive video detective games), broad subject matter of videos (e.g. mysteries), and/or time and date that the user may desire to view a video. Programming preferences are principally directed at the selection of a specific video.

The term "content-on-demand system" refers to a video-on-demand system that is responsive to a user's content preferences. A content-on-demand system not only permits a user to obtain a specific video(s) or segment(s) of videos in response to the user's programming preferences, a content-on-demand system also permits the user to receive a version of the video(s) or segment(s) of videos that are responsive to the user's other types of content preferences. A content-on-demand system and the delivery of variable content video services as described herein may utilize a variety of types of hardware and network infrastructure and are not limited to any particular hardware or network infrastructure that may be employed in a given implementation.

The terms "descriptors" and "keywords" refer to words, terms, phrases, keywords, designations, codes, descriptors, labels, data, metadata, numbers, or other information that identifies, describes, categorizes, and/or provides information. Descriptors and keywords comprise, for example, words that identify, describe, categorize, and/or provide information about an item depicted within a video.

The term "dialog" refers to a dialog, conversation, monologue, lyric, utterance, and/or communication. Dialog also comprises information that may be included in the subtitles or the closed captioning.

The term "feature-length movie" refers to a feature-length movie, a feature-length motion picture, a full-length motion picture, full-length movie, feature movie, feature film, and the like. A feature-length movie is a video which runs for 40 minutes or longer. Theatrically-released full-length movies released by a major motion picture studio generally exceed 80 minutes. A feature-length movie does not require a particular format (e.g., digital, analog, dimension) or media/transport (e.g., film).

The term "item" refers to: (i) items, products, objects, properties, acts, or information, whether or not they offer a commercial or purchase opportunity; (ii) items, products, objects, properties, acts, or information that constitute actual or potential product placements, whether prior to or after production of the video; (iii) product placements; and (iv) items, products, objects, properties, acts, or information, that offer informational or entertainment opportunities. The term "product placement" refers to: (i) items, products, objects, properties, acts, or information that offer a commercial or purchase opportunity; (ii) items, products, objects, properties, acts, or information that constitute actual or potential product placements, whether prior to or after production of the video; and (iii) product placements.

The term "keywording" refers to associating descriptors and/or keywords.

The term "network" herein refers to any private or public, wired or wireless video transmission infrastructure, such as may be provided by the utilization of one or a hybrid combination of the following: fiber optic, coaxial cable, twisted copper wire, cellular, radio, satellite, and/or other existing and/or forthcoming video transmission technologies. Examples include a Broadband Integrated Services Digital Network ("B-ISDN") utilizing fiber optic cable in its primary trunks, a Digital Subscriber Line that provides high bandwidth over twisted copper-pair phone lines, and the internet. In the broadest sense, a network also comprises the utilization of, for example, the U.S. Postal Service to deliver DVDs.

The term "noteworthy" in connection with an item refers to an item that: (i) may be of interest to a significant audience; (ii) is noteworthy, remarkable, or compelling; (iii) is uncommon, atypical, peculiar, unusual, unique, rare, or extraordinary; (iv) is purchasable; and/or (v) is a product placement.

The term "performer" refers to an individual, participant, actor, or actress, appearing in a video and/or credited for the physical and/or the verbal performance of a character. A performer refers to, for example, an actor in a motion picture, an athlete in a televised sporting event, a newscaster in a news program, and a chef in a cooking show.

The term "playing", dos nor require a playing of the entirety of a segment or portion of a video and does not necessarily require that a playing of every aspect of the video, audio, sub picture, and/or bit of data of a frame or segment.

The term "search terms" refers to terms, words, phrases, designations, codes, descriptors, labels, data, metadata, numbers, or other information that identifies, describes, or specifies what is being searched.

The terms "segment" and "video segment" refer to one or more video frames.

The term "shot" refers to a sequence of video frames resulting from a single continuous run of a video camera.

The term "user" as used herein is meant to include and be interchangeable with the words "player" (when referring to a person), "subscriber", and "viewer". That is, the term "user" is to be understood in the general sense of, for example, a person actively using video content, passively viewing a video, interactively playing a video game, retrieving video from a video provider, and/or actively using multimedia, interne, and/or communication services.

The term "variable content video" refers to a video characterized by a nonlinear architecture facilitating a variety of possible logical sequences of segments. A variable content video comprises segment information and parallel, transitional, and/or overlapping segments. The parallel, transitional, and/or overlapping segments may support, for example, objectionable content control and focused versions. A variable content video may also include a user interface, software program routines, and system control codes for controlling the playing of the video/audio.

The terms "video" and "video program" are interchangeable and refer to any video image regardless of the source, motion, or technology implemented. Unless otherwise qualified to mean a computer software program, the term "program" is interchangeable and may be replaced with the word video. A video comprises images found in full motion picture programs and films, in interactive electronic games, and in video produced by multi-media systems. Video comprises still characters, graphics, images, motion pictures, films, and multimedia productions; feature-length movies, shorts, and television programming; news, sports, cultural, entertainment, commercial, advertisements, instructional, and educational programming. As the context permits, a video may also comprise video, audio, sub picture information, a video map (e.g., navigation data), or other information associated with the video, such as a user interface, software program routines, and system control codes.

The terms "video map", "map", and "segment map", refer to a combination, arrangement, table, database, or listing of information comprising an identification of a beginning and ending of one or more segments and at least one descriptor associated with at least one segment or a sequence of segments. A video map comprises, for example, a combination, arrangement, table, listing, tables and fields, database, metadata, or xml file, or other data comprising segment information.

The term "video-on-demand system" refers to any video delivery system that is responsive to a user's programming preferences, i.e. provides a user-selected video at a user-selected time. Video-on-demand comprises for example movies-on-demand, video dial tone, cellular video, and digital satellite systems that are responsive to a user's time and date preferences and that provide play control functionality in the viewing of a video.

Where not clearly and unambiguously inconsistent with the specific context, these and other terms defined herein are to be understood in the broadest sense.

The teachings herein with respect to a video may be applied to, for example, any type or kind of content that may be captured in a video format, including motion pictures, movies, television programs, news programs, sports programs, educational videos, advertisements, informational, commercials, and other videos that promote products and services. While a particular feature may be detailed with respect to a specified type of video, it is intended to apply the teachings herein broadly and harmoniously across all different types and classes of video, including, for example, and not by way of limitation, a variable content video and a variable content game.

FIG. 1A is a representation of a video frame within a motion picture and the display of an indication that information is available for an item being depicted. The frame 100 of the video depicts three characters: a boy 110 holding balloons 111, a girl 120 wearing a dress 121 and a man 130 wearing a hat 131. In this particular invention, the play location is monitored for the presence of a purchasable item. The current play location within a video is monitored and a plurality of segment definitions is searched to identify a segment definition that is responsive to the play location. In the instance that a segment definition is responsive to the play location, and during the period defined by the segment definition, an indication 140 is displayed that item information is available for an item or items being depicted. In this example, the indication is an icon of a shopping bag 140 superimposed in each frame of video during the period defined by the responsive segment.

A segment definition defines, responsive to a depiction of an item, a beginning and an ending of a video segment within the video. A segment definition is associated with item information. There are a number of different methods that may be implemented for a segment definition to define a beginning and an ending of a video segment within the video. For example, a segment definition may directly specify a beginning point of a portion of content (e.g., a segment) within the video, and directly specify an ending point of a portion of content within the video. In a second example, a segment definition may directly specify a beginning point of a portion of content within the video, and indirectly specify an ending point of a portion of content within the video by specifying a duration of the portion of content. In a third example, a segment definition may indirectly specify a beginning point of a portion of content within the video and indirectly specify an ending point of a portion of content within the video, by, for example, individually specifying one or a plurality of individual units of content (e.g., a video frame or a group of pictures). Accordingly, a segment definition may define, responsive to a depiction of an item, a beginning and an ending of a video segment within the video by, for example, specifying a single video frame. Such as segment consists of a single video frame. A video frame is any image or partial image in any digital or analog format comprising, for example, a frame of video, a video field, an I, B, or P frame. A video frame may comprise audio information. The term "specify" should be understood in the broadest sense and comprises the meaning associated with the following terms: detail, indicate, enumerate, stipulate, identify, and their respective synonyms. The terms "segment definition" and "segment definitions" should be understood in the broadest sense and comprises the meaning associated with the following terms: datum, data, information, and their respective synonyms.

Similarly, there are a variety of methods for associating item information with a segment definition. For example, item information is associated with an item, the item is associated with a frame location where the item is depicted within the video, and the frame location is associated with a segment definition. In that example, item information is indirectly associated with a segment definition. Information associated with a segment definition does not require any particular direct or indirect methodology.

A beginning and ending of a segment may be defined by a variety of means including, for example, time codes in a seconds and milliseconds format or an HH:MM:SS:FF (Hours, Minutes, Seconds, and Frames) format, bit positions, logical positions identifiers, or any format that can consistently identify a location or position in a video. A segment definition may be individually responsive to a single depicted item or to multiple depicted items. In those instances where a segment definition is associated with only a single item. Advantageously, segment definitions may overlap but not necessarily congruently.

Figure 1B:
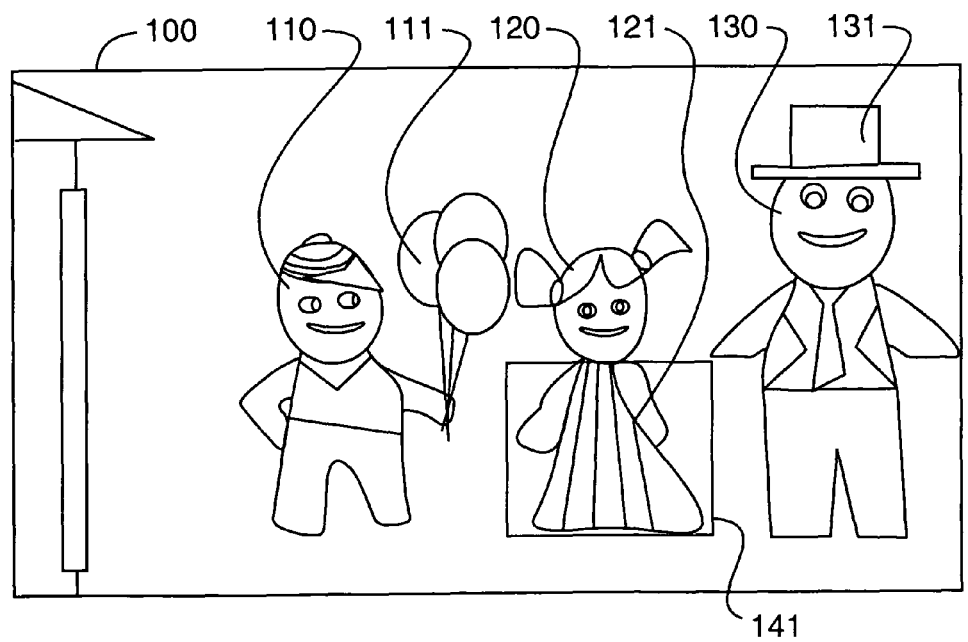
FIG. 1B is a representation of a video frame within a motion picture and the highlighting of an item for which information is available.

An indication that item information is available for an item can take many forms, including, for example, text, actual images of the item, representations of the items, or anything visual or audio that would signal to the user that information is available on an item being depicted. For example, as is illustrated in FIG. 1B, alternatively or additionally, the item being depicted for which information is available may be highlighted by an outline 141, or highlighted by an area of increased brightness as if a spotlight was focused on the item. Such an embodiment may implement item frame coordinate and dimension information associated with a frame identifier. A display of an indication that item information is available may be a generalized, categorized, individualized icon or other visual representation, or a picture of the actual item, extracted from within the video or external to the video. For example, a shopping bag icon may be displayed in connection with a purchasable item. A musical note icon may be displayed in connection with a purchase musical item, e.g., a song being currently played within the video. A travel icon may be displayed in connection with travel destination and accommodations information. An indication that item information is available may be responsive to multiple items. For example, multiple shopping bags and musical icons may be contemporaneously displayed. In instances of multiple items, a shopping bag icon may include the depiction of a number to indicate the number of items at that location for which item information is available.

The same noteworthy item may appear in multiple different locations within a feature-length movie. In such a case multiple segment definitions are created, each responsive to the particular depiction of the item. Preferably, the selection of which of the particular depictions are selected for the creation of a corresponding segment definition is responsive to suitability and novelty of the depiction and other considerations associated with, for example, the marketing of the item. Nonetheless, a user may not desire the displaying of an indication that item information is available for each of the depictions of that item for which a segment definition was created. Advantageously, a displaying of an indication that item information is available may be also responsive to a user pre-established indication display frequency. To accommodate such a user option, a segment definition may be further associated with a frequency determinant (e.g., primary, secondary, or numeric rank). A user desiring to limit the frequency that the displaying of an indication that item information is available would select the display of only primary depictions or depictions ranked highest (e.g., a "1" rather than a "2").

As previously recited, an item comprises: (i) items, products, objects, properties, acts, or information, whether or not they offer a commercial or purchase opportunity; (ii) items, products, objects, properties, acts, or information that constitute potential product placements, whether prior to or after production of the video; (iii) items, products and services that offer purchase opportunities; and (iv) items, products, objects, properties, acts, or information, that offer purely informational or entertainment opportunities. It is advantageous to in fact provide a balanced mix of purchasable items and entertainment items. A purchasable item that is also entertaining in the information associated with it offers a desirable balance between commercialism and entertainment.

Figure 1C:
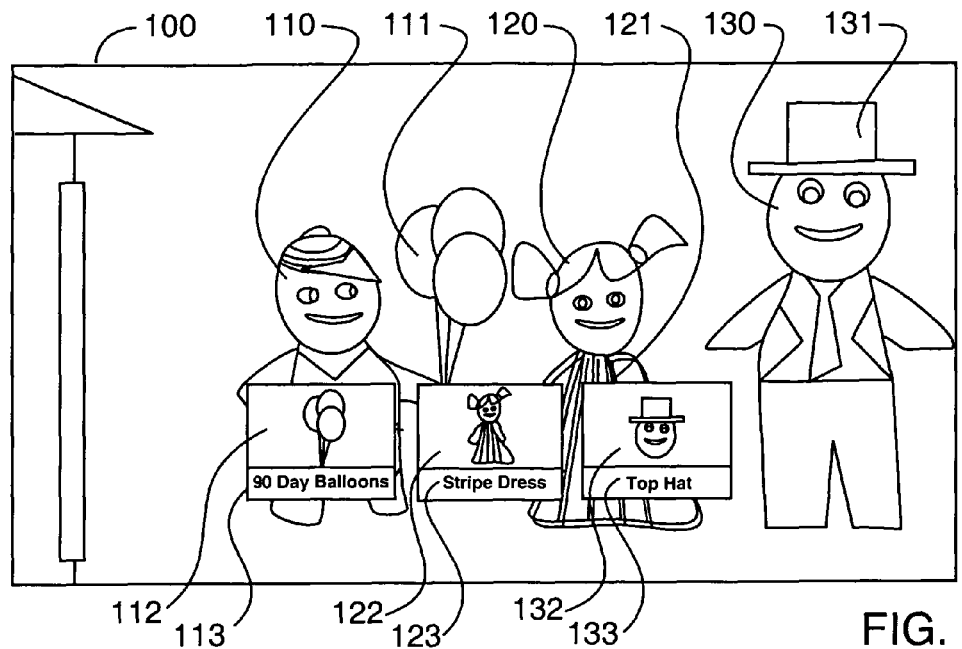
FIG. 1C is a representation of a video frame with a display of item information.

FIG. 1C is a representation of a video frame following a request, from a user, for item information. In a separate inventive methodology, such a user request is not in response to the display of an indication that item information is available. In the particular embodiment that is illustrated, superimposed on that frame of video is item information for each of the items on which information is available. In the case of the balloons 111, the item information comprises the display of an image of the item extracted from within the video 112 together with a textual identification of the item "90 Day Balloons" 113. In the case of the girl's dress 121, the item information comprises the display of an image of the item extracted from within the video 122 together with a textual identification of the item "Stripe Dress" 123. In the case of the man's top hat 131, the item information comprises the display of an image of the item extracted from within the video 132 together with a textual identification of the item "Top Hat" 133. An image of an item depicted in a video need not be extracted from the video in real-time. A preprocessing of the video and extraction of images can generate the necessary identifying images. In such an instance an item or segment definition is associated with a particular video frame location. An optional implementation of frame coordinates and size requirement can provide for an isolated and magnified depiction of the item for identification purposes. An image of an item depicted in a video need not be extracted from the video itself, a suitable image of the item may be provided by a great variety of means including, for example, downloading an item image from a suitable website by means of a link provided with information associated with, for example, the segment definition or item identifier. A visual depiction need not be limited to a single image or frame of video, a visual depiction comprises video.

The term "displaying item information" refers to a display of item information for a single item and, as the context may require, to a display of item information for each of a plurality of items. For example, FIG. 1C illustrates a "displaying item information" comprising a display of item information 112 113 for the balloons 111, display of item information 122 123 for the dress 121, and a display of item information 132 133 for the hat 131. Further, a display of a single item information may provide information for a single item or for a set of items. For example, the display of item information comprising the display of an image of the item extracted from within the video together with a textual identification of the item may be associated with additional information about the product, a service related to the product, and insurance. While item information may comprise additional item information such as item purchase information, there is no requirement that item information itself provide any specific information.

The embodiment illustrated in FIG. 1C offers several advantages. For example, the inclusion of an identifying picture 112, 122, 132 enables easy visual identification by the user. FIG. 1C shows that the visual depiction that is extracted from within the video is a suitable video frame, preferable depicting a close-up or medium shot of only the item. The inclusion of an identifying picture or video content from within the video is in certain situations more advantageous in facilitating identification than including an image of the item, such as may be obtained from an advertising photograph. Providing the textual identifier is also advantageous in enabling the user to obtain more information. In a preferred embodiment, and optionally in response to a pre-established user preference, the visual depiction is a previously downloaded image of the item specially created for the item identification routines. In an alternate embodiment, clicking on an identifying image may toggle between a visual depiction that is extracted from within the video and, for example, a marketing image of the item.

In the illustration of FIGS. 1A and 1C, the frame of the motion picture is unchanged. In other words, the example presumes that the user has activated the item identification routines at that instant that the target item is on the screen. This need not be, and is often not, the case, especially where the user elects not to enable routines that monitor the depiction of certain items. A user may request item information for an item that was just depicted but is no longer currently depicted, whether or not an indication that item information is available was displayed. To accommodate those situations, a number different inventive methodologies may be implemented to take into consideration a request location or a predetermined play period prior to the request location, and/or segment information. For example, the request location (e.g., a frame within the video) may be adjusted to include the request location and a predetermined play period prior to the request location, for example, 10 seconds. In that particular example, the request location is a period of time, at 30 frames per second, of 301 contiguous frames. In this fashion, a segment definition is responsive to a request location if it is congruent with any portion of the period of time defined by the request location or a predetermined play period prior to the request location. Alternatively, in determining if a segment is responsive to the request location or a predetermined play period prior to the request location; the segment definition may be adjusted.

Figure 1D:
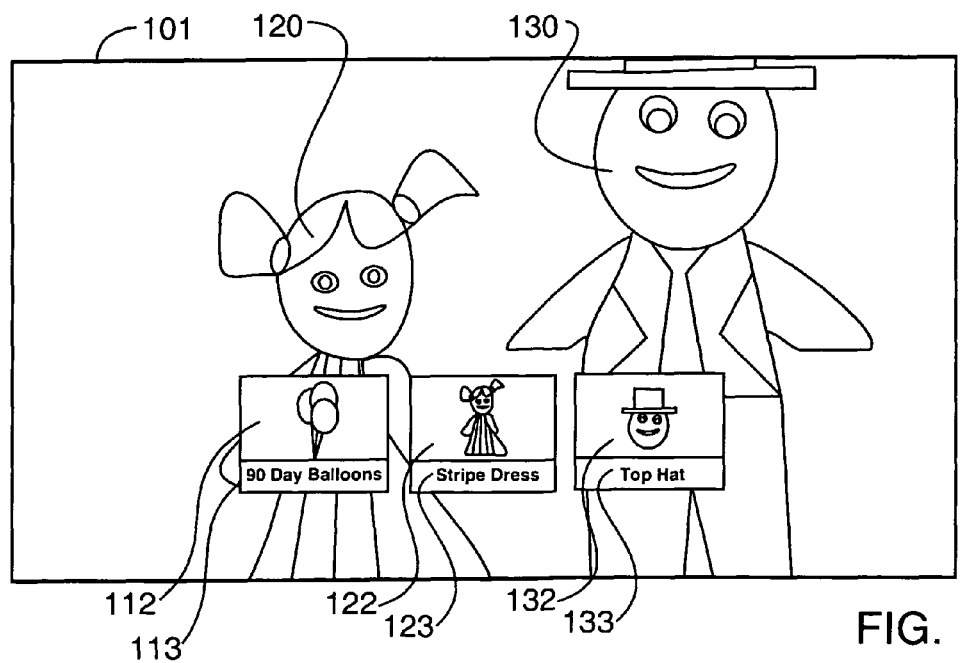
FIG. 1D is a representation of a video frame following the video frame shown in FIG. 1C.

FIG. 1D is a representation of a video frame 101 within the motion picture at a subsequent instance within the same clip that includes the video frame 100 shown in FIG. 1C. In this case, the camera has focused on the girl 120 and the man 130. The "90 Day Balloons" 113 depicted in the video frame 100 of FIG. 1A is not depicted in the frame 101, and only the ream of the "Top Hat" 133 of FIG. 1A is depicted in the frame 101.

In this example, the item identification routines are configured to search a plurality of segment definitions to identify segment definitions that are responsive to the request location and a predetermined play period prior to the request location. In this instance, since the segments definitions for each of the noteworthy items are responsive to either the request location or the predetermined play period prior to the request location, an image and textual identification are nonetheless provided for the "90 Day Balloons", the "Stripe Dress", and the "Top Hat" (FIG. 1D 112, 113, 122, 123, 132, 133).

A segment definition that is responsive to the depiction of an item does not necessarily require that the item be depicted within each of the frames of the video segment defined by the segment definition. In certain situations, this would advantageously avoid a flashing display of the indication that item information is available. An embodiment that is based on segment definitions offers advantages over an embodiment based on a precise video frame specific identification. A segment based embodiment does not require the user to pause the playing of the video at a video frame depicting the item of interest since it is not dependent on the actual contemporaneous onscreen presence of that item. Nonetheless, precise video frame specific identification, as might be generated by image recognition methodologies, can provide, in an alternate embodiment, the source of item location information. In such embodiments, the item location information is associated with item information.

Figure 1E:
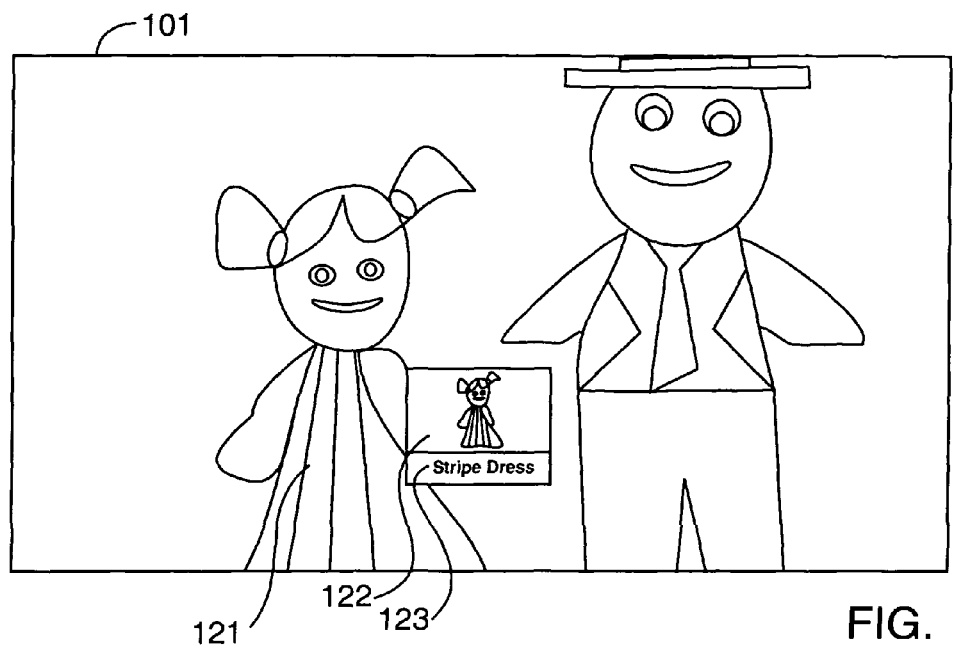
FIG. 1E is a representation of a frame accurate display of item information.

FIG. 1E illustrates a frame accurate embodiment where the display of item identification information is limited to the item actually depicted in the video frame. In this example, since frame 101 does not depict the 90 Day Balloons and does not adequately depict the Top Hat the identification information for those items is not displayed. Instead, since only the girl's dress 121 is adequately depicted, an image identification 122 of the dress is displayed 122, together with a textual identification of the item "Stripe Dress" 123. A frame accurate mapping of information may be adjusted to overcome its limitations by the implementation of algorithms that, for example, address proximity, velocity of shot changes, and/or changes in scenes/chapters. For example, identification routines could utilize the purchasable item identification information data associated with the current video frame and the data associated with the preceding six seconds of video. The identification routines could, alternatively or additionally utilize all the frame data of the video frames that are within a clip definition.

A frame accurate mapping of information can elegantly support a continuous display of identification information contemporaneously with the playing of the video. The display of identification information need not require the pausing of the playing of the video. The item identification routines may be continuously activated while video is playing and be responsive to an on/off toggle.

Figure 1F:
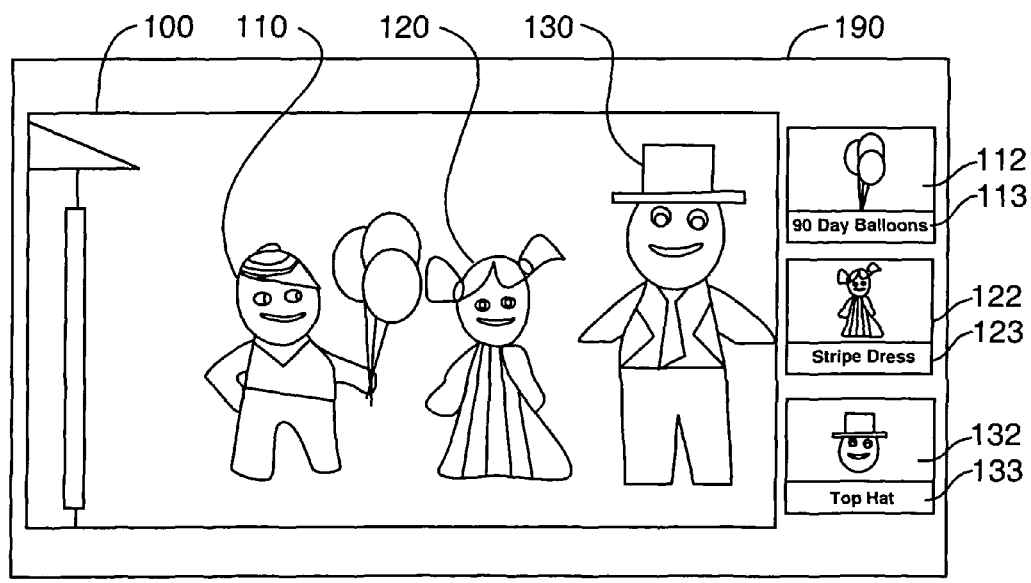
FIG. 1F is a representation of a video screen where the display of item information is not superimposed on the video.

FIG. 1F is a representation of a video screen where the display of item identification information is advantageously not superimposed on the video. Large screen and monitors 190 can easily accommodate both the continued playing of the video 100 and the display of contemporaneously updated item identification information (131, 132, 133; 111, 112, 113; and 121, 122, 123). This display arrangement offers advantages that are independent of whether a video segment or video frame mapping methodology is implemented and whether the display of item identification information is continuously contemporaneously updated.

An embodiment that relies on frame accurate item identification information is capable of providing contemporaneously updated frame accurate identification of the item actually depicted in each video frame as the video frame is displayed. As illustrated in FIG. 1G, the video frame 100 played on the screen 190 depicts a boy carrying balloons 110, a girl 120, and a man 130. Optionally, with continuous item information enabled, item identification information 112, 113, 122, 123, 132, and 133 are provided responsive to the actual depiction of an item. In the instance that a subsequent video frame (101 FIG. 1E) is played on the screen 190, only the item identification for the dress would be provided. This process of providing contemporaneously updated frame accurate identification of the items would be continued while the video is being played and the item identification routines are activated. An embodiment based on the segment definitions would provide similar functionality with the previously noted relative advantages and disadvantages.

Item identification information, as is for example illustrated with respect to FIG. 1C (112, 113, 122, 123, 132, and 133) may also serve as a means (e.g., clickable buttons) to enable the user to request additional item information relating to a displayed item information which is response to an item depicted within the video. An item information may constitute a button/object associated with a "clickable" event that when activated would launch the additional information routines.

In response to receiving such a request for additional information for an identified item, additional item information, such as purchase information is provided. Many sources either provided or integrated with the video or external to the video may provide additional item information, including, for example, a variety of web sites, or various sources that may identify items present in a video. Additional item information may be downloaded from a suitable website by means of a link or reference data provided with information associated with, for example, the segment definition or item identifier. Retrieval of additional information may be real-time, or non-real-time and pre-stored in volatile or non-volatile memory for use when needed. While additional item information may comprise many items and categories of additional item information, there is no requirement that additional item information itself provide any specific information.

In a preferred embodiment, item identification information is associated with a unique identifier. When a user requests additional information, the user's apparatus capable of processing data and instructions executable by a processor, performs the step of providing the unique item identifier to a source remote to the apparatus that is dedicated to maintaining updated detailed additional item information specifically produced and edited for display within the video. The unique item identifier may be accompanied with or incorporate video identification and play location identifiers to obtain additional item information that is responsive to the play location within the particular video. For example, a necklace may appear in connection with different garments, e.g., the Algerian Love Knot in the motion picture "Casino Royale" is worn by the character with different garments and in different locations. The additional information that may be provided with the necklace item information would be responsive to the particular garment, situation, and/or location depicted in the video at the moment that the user request was received for item information in response to the display of an indication that item information is available.

When the user elects to exit the additional information environment, e.g., a page in a website, the playing of the video may be automatically resumed at a location that is responsive to the request location. Resuming a playing of the video responsive to the request location following a termination of a displaying of additional item information does not require resuming a playing of the video at the exact location at which the request for item information was received. The resumption location may be responsive to other considerations including, for example, technical limitations. In a preferred embodiment, rather than resuming a playing of the video at a location that is responsive to the request location, a playing of the video is resumed at a location that is also responsive to one or more determinants, such as, the amount of time that the playing of the video has been paused, the beginning or ending of the segment depicting the item, and/or a beginning of a clip or scene. The suitable location for resuming the playing of the video may be directly identified by a segment definition that is responsive to the request location. Further, the automatic resuming of the playing of the video may itself be responsive to the number of item for which item information is displayed. For example, if item information is displayed for multiple items, then the playing of the video would be not be resumed following a termination of a displaying of additional item information.

Figure 2A:
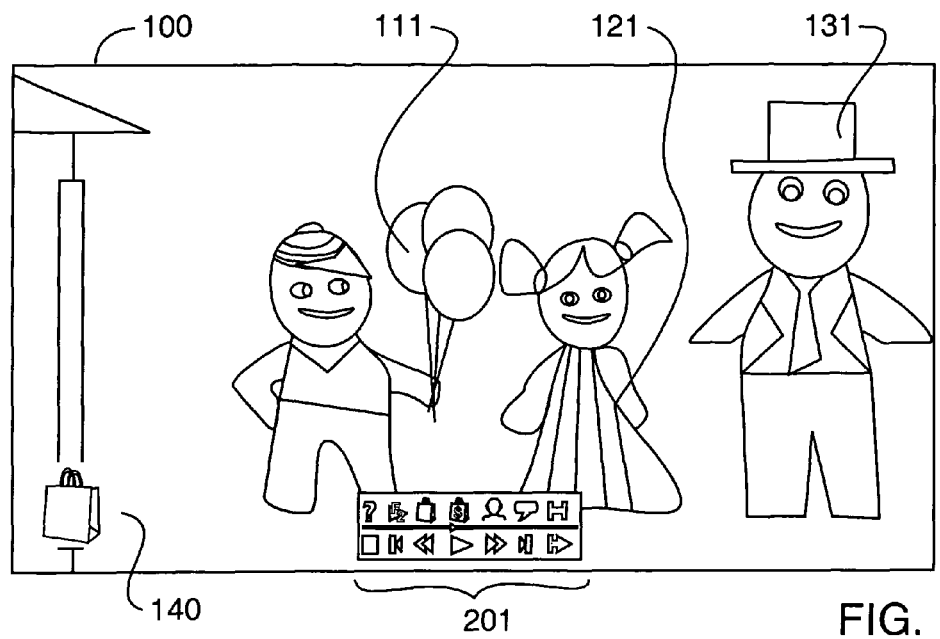
FIG. 2A is a representation of a video frame within a video comprising a play control panel.

To activate the item identification routines, a user may be provided a number of means, including, onscreen playing controls, remote control keys, voice control, other user interfaces, and/or any combinations of these methodologies and means. FIG. 2A is a representation of a video frame within a motion picture comprising a play control panel 201 as may be advantageously implemented in, for example, a personal computer mouse control embodiment or a touch screen control embodiment. On either embodiment, clicking or touching the lower portion of the screen would cause the display of the play control panel 201 that comprises a plurality of buttons/objects each associated with a respective event.

Figure 2B:
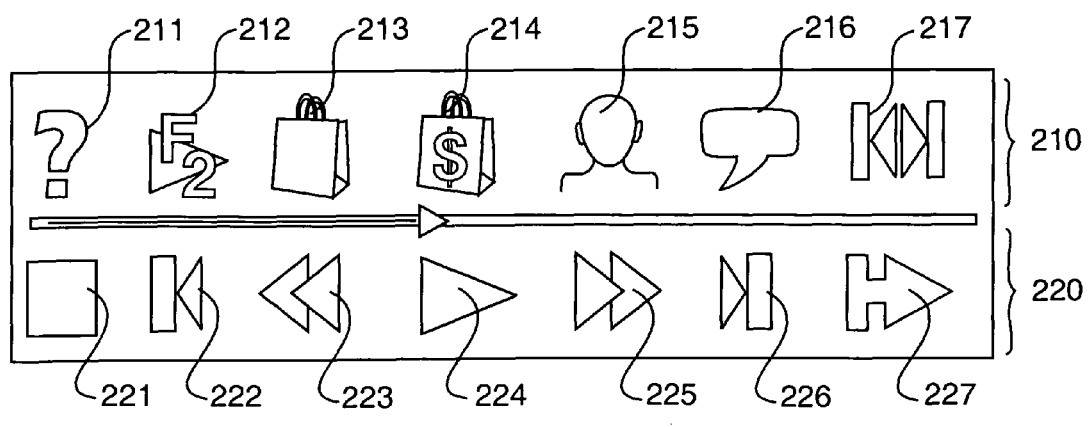
FIG. 2B is a magnified representation of the play control panel shown in FIG. 2A.

FIG. 2B is a magnified representation of the play control panel shown in FIG. 2A. The play control panel comprises a plurality of play control buttons/objects 220, such as Exit 221, Skip Back Clip/Segment Set 222, Fast Rewind 223, Play/Pause Toggle 224, Fast Forward 225, Skip Forward Clip/Segment Set 226 and Play From 227. In this example, the play control panel also comprises plurality of function activation buttons/objects 210, such as Help 211, Features Menu 212, Shopping Indication 213, Shopping Information 214, Who 215, What 216, and Play current Scene 217. Clicking or pressing the Shopping Indication 213 play control button/object causes the activation/deactivation of the item indication routines that cause the display of the indication (e.g., FIG. 2A 140) that item information is available for an item being depicted. Clicking or pressing the Shopping Information 214 play control button/object causes the activation of the display of item information. (e.g., FIG. 1C 112, 113, 122, 123, 132, and 133)

Figure 3:
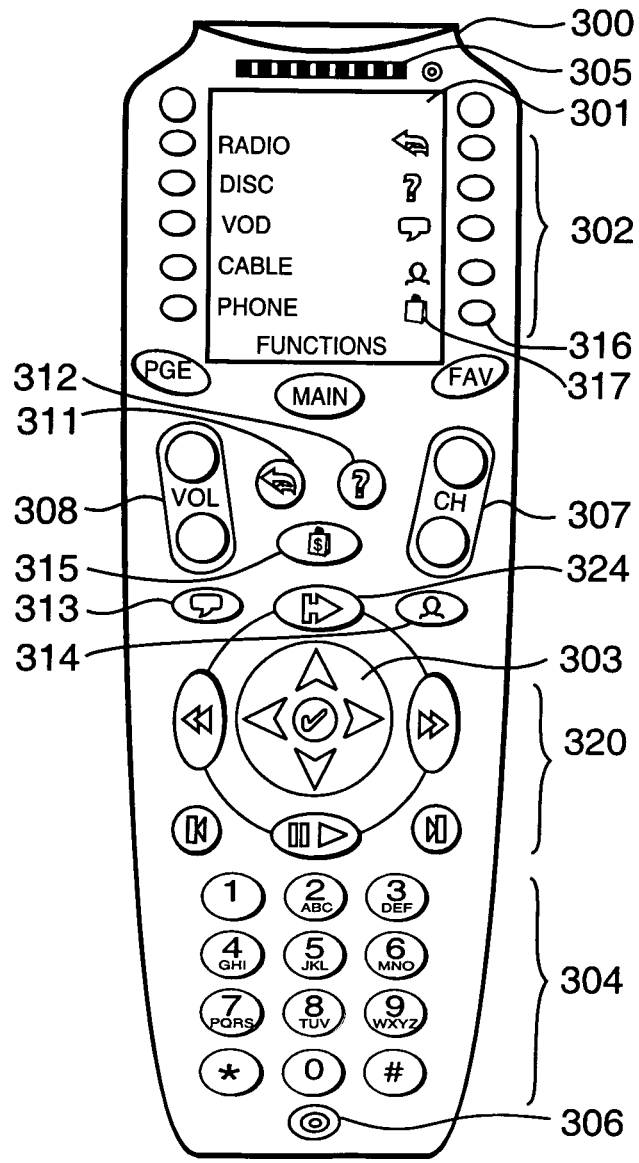
FIG. 3 is an illustration of a remote control device.

A remote control device as per the teachings herein may be based on any number of technologies both wired and non-wired. FIG. 3 is an illustration of a remote control device 300 that, for example, comprises: a display screen 301 that additionally responsibly labels interactively defined function keys 302; screen position and menu controls 303; telephonic alphanumeric key pad 304; speaker 305; microphone 306; channel controls 307; volume controls 308; play control keys 320 (e.g. Pause/Play) and Play From 324. This particular remote control embodiment additionally implements a plurality of dedicated function activation keys, such as Exit 311, Help 312, What 313, Who 314, and Shopping 315. The remote control's Shopping 315 dedicated function activation key enables a user to request, during a playing of a video, item information relating to an item depicted within the video.

Alternatively, function activation may be provided by the display screen 301 that would responsibly label interactively defined function keys 302. For example, interactively defined and labeled function key 316 is labeled with a shopping bag 317 to associate the key with the activation/deactivation of the item identification routines that display an indication that item information is available for a currently depicted item. The interactively defined and labeled function keys permit a reduced set of function keys to provide access to individual sets of multiple functions as is suggested by the illustration.

In particular the interactively defined and labeled function keys may be automatically configured and reconfigured by a specific video transmission or other information downloaded from, for example, the multimedia player. For example, when a specific viewer accesses the remote control, the display may show blinking icons for voicemail and email received for that individual. Advantageously, the remote control device may produce an indication (e.g., flashing icon or Shopping function key 315) that item information is available for an item being currently depicted.

Keys may be labeled, and other keys found in the art may be added responsive to the particular requirements of the functions implemented. Further, the capabilities, functions, keys and other elements of a remote control device may be synergistically integrated with a remote keyboard with integrated touch pad and/or pointing device. In such embodiments, the function keys or dedicated keys, for example, may be configured to provide direct access to the various functions.

Figure 4A:
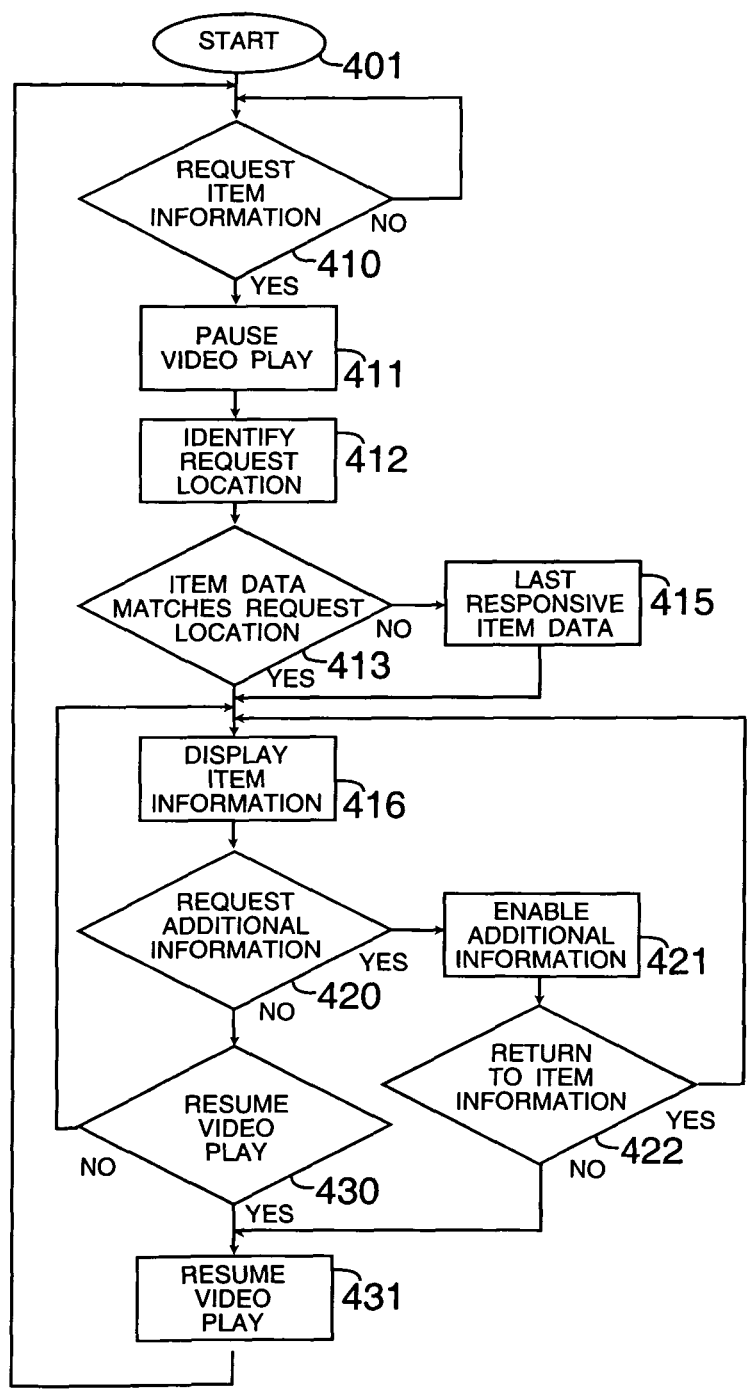
FIG. 4A is a flow chart of a set of steps for providing a user item information for an item depicted in a video.

During a playing of a video, a user may desire to obtain item identification information and/or shopping information for an item being depicted within the video. In such situations, it is advantageous to be able to provide, a user during a playing of a video, item information for certain item being depicted, especially where those items are product placements. FIG. 4A is a flow chart of a set of steps for providing a user item information for an item depicted in a video.

In a preferred embodiment, when a request is received from a user for item information 410, then the playing of the video is automatically paused 411 if not already paused. Alternatively, the pausing of the video 411 may be optional as a user may desire that the video continue playing while the item identification routines remain active during the video playing. As shown with respect to FIG. 1F, a user may prefer to obtain contemporaneously updated frame accurate identification of items as the video continues to be played. In such cases, user preference would disable the item identification routines from automatically pausing a playing of the video.

A user may request item information using a variety of technologies and methodologies. For example, clicking or pressing an item information play control button/object in an user interface would be received, during a playing of a video, as a request from a user for item information relating to an item depicted within the video. As detailed with respect to the play control panel of FIG. 2B, clicking or pressing the Shopping Information 214 play control button/object causes the activation of the display of item information routines, and the display, when available of item information. In the case of the use of a remote control device, pressing an appropriate key would be received, during a playing of a video, as a request from a user for item information relating to an item depicted within the video As detailed with respect to the remote control device of FIG. 3, the remote control's Shopping 315 dedicated function activation key enables a user to request, during a playing of a video, item information relating to an item depicted within the video.

Contemporaneously with a pausing of the playing of the video 411 (FIG. 4A), a request location (e.g., time code, frame identifier, or some other indicator of the place or location, within the video that is currently being played) is identified 412 that is responsive to the request for item information. A location within the video may be identified by a variety of means including, for example, time codes in a seconds and milliseconds format or an HH:MM:SS:FF (Hours, Minutes, Seconds, and Frames) format, frame identifiers, bit positions, logical positions identifiers, or any format or other indicator that can consistently accurately identify a location in a video. A location may also be referred to as a position or place. In a multi-video embodiment, the identification of the video being currently played is particularly material in those situations where the presentation comprises the playing of segments retrieved from within a plurality of videos. The video may be identified by any of a number of methodologies being currently practiced or known in the art.

Dependent on the particular embodiment, to allow for delays by the user to request item information, the identification of the request location 412 may be responsive to a pre-established delay adjustment preference, such as, a user's specific previously defined amount of time, e.g. 10 seconds. Herein, whether a user's preference or a system's preference, pre-established means that the amount is not dependent on a user's action at the time of the request. Pre-established does not necessarily mean that the preference is not responsive to the particular segment being played. In those instances that the playing of the video is voice controlled, separate default values may be established to accommodate the fact that user may be more likely to say Shopping faster than to be able to press a Shopping button on a remote control specially while viewing a full length motion picture. In a preferred embodiment, rather than a user configuring the system at the time of installation or a first playing, autoactive software routines would learn the user's preferences from the user's actions, and adjust the various settings accordingly.

Once a request location 412 is identified, the item data is queried (e.g., a plurality of segment definitions are searched) 413 to identify segment definitions that are responsive to the request location. A segment definition is responsive when it includes the request location within the beginning and ending of the defined segment. A request location matching either the beginning point, the ending point, or any point in between is deemed to be within the beginning and ending. In one embodiment, identifying a segment definition that is responsive comprises, for example, comparing the time code of the request location and finding a segment definition having a beginning time code that is the same or earlier than the time code of the request location, and having an ending time code that is the same or later than the time code of the request location.

If a responsive segment definition is found 413, then item information associated with a responsive segment definition is displayed 416. To accommodate those situations, in which at the time that the user has requested item information 410, a segment definition is not responsive, the request location may be adjusted to include the request location and a predetermined play period prior to the request location, for example, 30 seconds. In this fashion, a segment definition may be responsive to the information request or a predetermined play period prior to the request location. In determining if a segment is responsive to the request location or a predetermined play period prior to the request location, the segment definition maybe adjusted and/or the request location/period may be adjusted. Advantageously, as shown in FIG. 1D, this method enables the retrieval and display of item information associated with a number of recently played depictions of items having item information available. The item identifying information, such as an item name and image, that are retrieved and displayed 416 enable visual identification by the user.

Item information may have been already retrieved and loaded into processing memory, and, thus, retrieval is from the memory. Alternatively, the item information is retrieved from any of a variety of storage memories as needed. Herein, the term "retrieve" should be understood in the broadest sense and comprises obtain, acquire, procure, download, transfer, extract, and to come into possession by any means or methodology.

If, for example, a user requests item information 410 for an item that was no longer being depicted, a segment definition may not be found that is responsive to the request location 413. In such situations, a proper message is displayed (e.g., item information not available for this location). Alternatively, a number of methodologies may be implemented to display item information 416 for a most recently depicted item for which item information is available 415. For example, segment definitions are searched to identify a segment definition that has an ending point prior to and closest to the request location.

If a user requests additional item information relating to displayed item information 420, then the display of additional item information is enabled 421 in response to the request for additional item information. It is understood that the retrieval, providing, and displaying of additional item information may be subject to the control of a third party provider or a source not within the control of the user's apparatus. The term herein "enabling a display" does not guarantee or require that in fact additional item information is retrieved, provided and/or displayed. For example, item information may be linked to a remote source that customarily provides additional item information but the source is not accessible at the particular time of the user request for additional item information. Such situations still satisfy the "enabling a display". Additional item information comprises, for example, information specific to the purchasing of the item, a transfer to a website's one click page, content previously downloaded, and content retrieved from within the video or from within a plurality of videos. For example, additional item information may provide depiction of the item extracted from a full-length movie franchise.

A user may request additional item information 420 using a variety of technologies and methodologies. For example, clicking or pressing an item information play control button/object in an user interface would be received, during the display of item information, as a request from a user for additional item information relating to a single item for which item information is displayed. Similarly, in the case of the use of a remote control device, pressing an appropriate key would be received, during the display of item information, as a request from a user for additional item information relating to a single item for which item information is displayed. Where item information is displayed for multiple items, selection of a desired one of the displayed item information would be required in connection with, for example, the clicking or pressing of an item information play control button/object or key in a user interface or remote control. For example, the displayed item information shown in FIG. 1C 112, 113, 122, 123, 132, and 133 may each constitute a button/object associated with a "clickable" event that when activated or selected by the user would constitute an additional item information request. In a remote control embodiment, the screen position and menu control keys (FIG. 3 303) enable a user to navigate among the display of multiple item information and select the desired one of the item information.

The display of multiple item information may be limited to a system or user pre-established number of the last depicted items prior to the request for item information. In a preferred embodiment up to five item information are displayed for items that were depicted within 30 seconds of the item information request, with the most recently depicted item being displayed to the right of the others.

Termination of the display of additional item information returns 422 to the display of the multiple item information 416 rather than automatically resume video play 431. This would be particularly advantageous where multiple item information is displayed as illustrated in FIG. 1C. Alternatively, termination of the display of additional item information automatically resumes video play 431 at the item information request location. A termination of the display of additional item information may take many forms, such as exiting the additional information function (e.g. exiting a website, and exit or escape request). Any terminating event that indicates that the user desires to resume video play may be considered a video play request.

If a user does not request additional item information relating to displayed item information 420, then a resume video play request is monitored and if received 430, display of the item information is terminated and play of the video is resumed 431 at the item information request location. At this point, unless terminated by another process, the item identification routines restart with the monitoring of a request for item information 410.

The flow chart of FIG. 4A has been intentionally drafted to disclose a number of possible embodiments. A number of permutations, combinations, substitutions, and/or additions in the specific steps, and recursive functions may be initiated at different points in the process than those illustrated. For example, in one of the various embodiments enabled herein, an apparatus capable of processing data and instructions executable by a processor; the apparatus, when executing the instructions, performs the steps of: receiving, from a user during a playing of a feature-length movie, a request for item information relating to a product placement depicted within the feature-length movie; pausing the feature-length movie in response to the request for item information; identifying a request location that is responsive to the request for item information; searching a plurality of segment definitions to identify a segment definition that is responsive to the request location or a predetermined play period prior to the request location, a segment definition defines, responsive to a depiction of a product placement, a beginning and an ending of a video segment within the feature-length movie; displaying item information associated with a segment definition that is responsive to the request location; receiving from the user a request for additional item information relating to a displayed item information; enabling a display of additional item information in response to the request for additional item information, the additional item information comprises product placement purchase information; and resuming, following a termination of a displaying of additional item information, a playing of the feature-length movie at a location that, responsive to a segment definition, precedes the request location.

In a second example, in another of the various embodiments enabled herein, an apparatus capable of processing data and instructions executable by a processor; the apparatus, when executing the instructions, performs the steps of: monitoring a play location within a video; searching a plurality of segment definitions to identify a segment definition that is responsive to the play location, a segment definition defines, responsive to a depiction of an item, a beginning and an ending of a video segment within the video; displaying, responsive to an identified segment definition, an indication that item information is available for an item being depicted, the displaying being also responsive to a user pre-established indication display frequency preference; receiving, from a user, a request for item information in response to the display of an indication that item information is available; pausing the video in response to the request for item information; identifying a request location that is responsive to the request for item information; searching a plurality of segment definitions to identify at least one segment definition that is responsive to the request location, the request location also comprises a predetermined play period prior to the request location; displaying item information associated with a segment definition that is responsive to the request location; receiving, from the user, a request for additional item information relating to a displayed item information; enabling a display of additional item information in response to the request for additional item information, the additional item information comprises item purchase information; and resuming, following a termination of a displaying of additional item information, a playing of the video at a location that, responsive to a segment definition, precedes the request location.

By contrast, in another of the various embodiments enabled herein, an apparatus capable of processing data and instructions executable by a processor; the apparatus, when executing the instructions, performs the steps of: receiving, from a user during a playing of a video, a request for item information relating to an item depicted within the video; pausing the video in response to the request for item information; identifying a request location that is responsive to the request for item information; searching a plurality of segment definitions to identify at least one segment definition that is responsive to the request location or a predetermined play period prior to the request location, a segment definition defines, responsive to a depiction of an item, a beginning and an ending of a video segment within the video; displaying item information associated with a segment definition that is responsive to the request location; receiving from the user a request for additional item information relating to a displayed item information; enabling a display of additional item information in response to the request for additional item information, the additional item information comprises item purchase information; and resuming, following a termination of a displaying of additional item information, a playing of the video at a location that, responsive to a segment definition, precedes the request location.

Advantageously, a user may desire that, during the playing of a video, an indication is displayed that item information is available for an item being currently depicted. A user may enable item notification routines that monitor the depiction of items within a video and display an indication that item information is available for an item being depicted. The inventive item notification enhancement to the methodologies previously detailed with respect to FIG. 4A offer a number of advantages including, for example, a better match between a request for item information for a particular item being depicted and the availability of corresponding item information. To some users, the inventive item notification enhancements offer a better user experience with obtaining item information for an item being depicted.

Figure 4B:
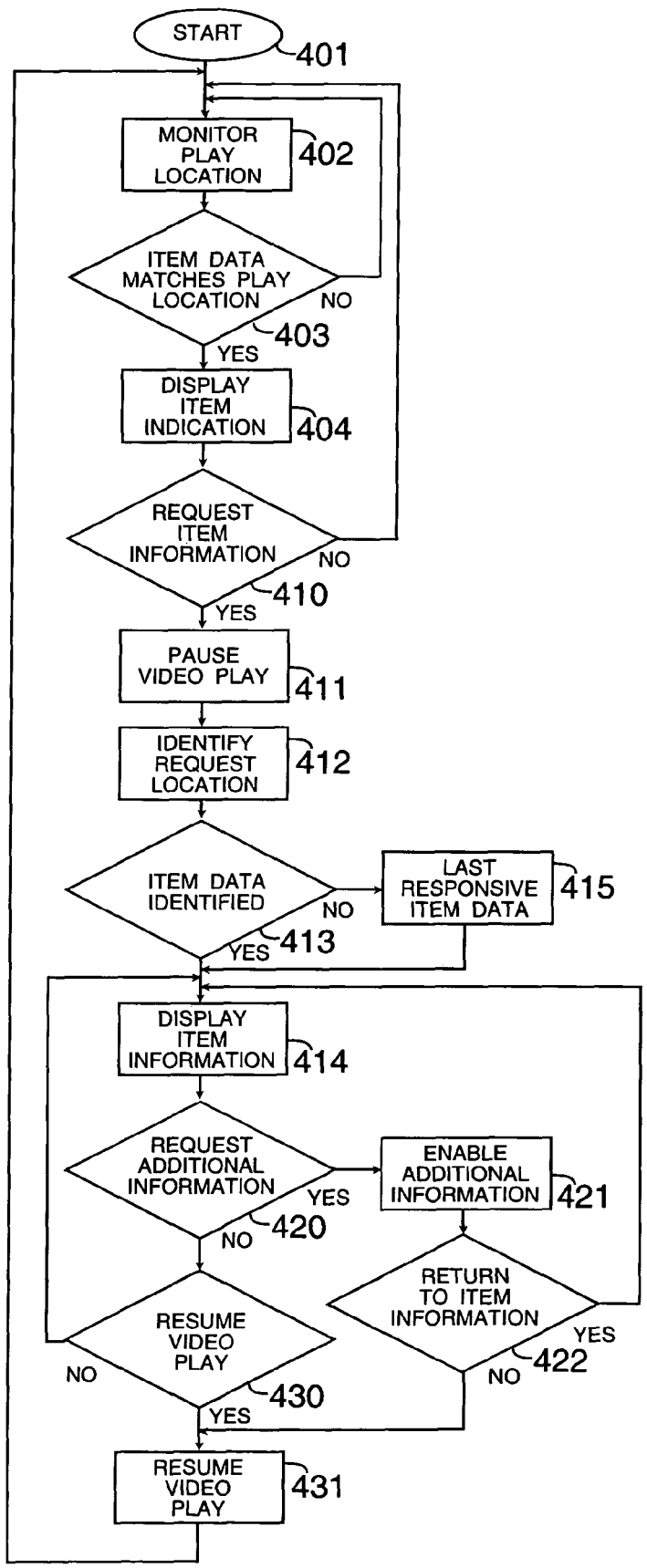
FIG. 4B is a flow chart of a set of steps for monitoring the depictions of items within a video and providing a user an indication that item information is available.

FIG. 4B is a flow chart of a set of steps for monitoring the depictions of items within a video and providing a user an indication that item information is available. If during a playing of a video, processing software receives a function activation event it determines whether an item identification routines have been activated or not. If the item notification routines are not activated, then an appropriate other function maybe executed.

A user may enable item notification routines by using a variety of technologies and methodologies. For example, clicking or pressing an item notification control button/object in a user interface would enable item notification routines. As detailed with respect to the play control panel of FIG. 2B, clicking or pressing the Shopping Indication 213 play control button/object causes the activation/deactivation of the item notification routines. In the case of the use of a remote control device, pressing an appropriate key would also enable the item notification routines. As detailed with respect to the remote control device of FIG. 3, the remote control's interactively defined and labeled function key 316 labeled with a shopping bag 317 enables a user to activate/deactivate the item notification routines.

If the item notification routines have been activated 401, in a preferred embodiment, an apparatus capable of processing data and instructions executable by a processor; the apparatus, when executing the instructions, monitors a play location within a video 402. A location within the video may be identified by a variety of means including, for example, time codes in a seconds and milliseconds format or an HH:MM:SS:FF (Hours, Minutes, Seconds, and Frames) format, frame identifiers, bit positions, logical positions identifiers, or any format or other indicator that can consistently accurately identify a location in a video. A location may also be referred to as a position or place. In a multi-video embodiment, monitoring of a play location within a video 402 comprises identifying the video currently played. The identification of the currently played video is material in those situations where the presentation comprises the playing of segments retrieved from within a plurality of videos.

Once a play location is identified, the item data is queried (e.g., a plurality of segment definitions are searched) 403 to identify segment definitions that are responsive to the play location. A segment definition is responsive when it includes the play location within the beginning and ending of the defined segment. A play location matching either the beginning point, the ending point, or any point in between is deemed to be within the beginning and ending. In one embodiment, identifying a segment definition that is responsive comprises, for example, comparing the time code of the play location and finding a segment definition having a beginning time code that is the same or earlier than the time code of the play location, and having an ending time code that is the same or later than the time code of the play location. If no segment definition is responsive to the play location 403, then the play location is continued to be monitored 402.

If a segment definition is responsive to the play location 403, an indication that item information is available for an item being depicted is displayed 404. If a request is not received from a user for item information 410 in response to the display of an indication that item information is available 404, then the play location is continued to be monitored 402.

In a preferred embodiment, if a request is received from a user for item information 410 in response to the display of an indication that item information is available 404, then the playing of the video is automatically paused 411 if not already paused. Alternatively, the pausing of the video 411 may be optional as a user may desire that the video continue playing while the item identification routines dynamically respond to changes in the current play location. As shown with respect to FIG. 1F, a user may prefer to obtain contemporaneously updated frame accurate identification of items as the video continues to be played. In such cases, user preference would disable the routines from automatically pausing a playing of the video.

Contemporaneously with a pausing of the playing of the video 411, a request location is identified 412 that is responsive to the request for item information. Dependent on the particular embodiment, and additionally or alternatively to the methodologies discussed with respect to FIGS. 1A, 1C, and 4A, to allow for delays by the user to request item information, the identification of the request location 412 may be responsive to a pre-established delay adjustment preference, such as, a user's specific previously defined amount of time, e.g. 10 seconds.

Following the identification of the request location 412, segment definitions are identified that are responsive to the request location 413. The identification of segment definitions that are responsive to the request location 413 is similar to the identification of a segment definition that is responsive to the play location 403. However, dependent on the particular methodology implemented it may not be necessary to query all or any of the segment definitions again. If a responsive segment definition is identified 413, then item information associated with a responsive segment definition is displayed 416. As previously detailed, to accommodate those situations, in which by the time the user has requested item information 410, a segment definition is no longer responsive, the request location may be adjusted to include the request location and a predetermined play period prior to the request location, for example, 30 seconds. In this fashion, a segment definition may be responsive to the information request or a predetermined play period prior to the request location. In determining if a segment is responsive to the request location or a predetermined play period prior to the request location, the segment definition maybe adjusted and/or the request location/period may be adjusted. Advantageously, as shown in FIG. 1D, this method enables the retrieval and display of item information associated with a number of recently played depictions of items having item information available. The item identifying information, such as an item name and image, that are displayed 416 enable visual identification by the user. If, for example, the user waits to long to request item information 410, a segment definition may not be found that is responsive to the request location 413. In such situations, a proper message is displayed, or alternatively item information that was associated with the last segment definition that was responsive to the play location 415 is displayed 416.

If item information has already been retrieved and loaded into processing memory, retrieval would be from the processing memory. Alternatively, as needed, the item information is retrieved from any variety of storage memories. If a user does not request additional item information relating to displayed item information 420, then a resume video play request is monitored and if received 430, display of the item information is terminated and play of the video is resumed at the item information request location 431. At this point, unless terminated by another process, the item notification routines restart with the monitoring of the play location 402.

If a user requests additional item information relating to displayed item information 420, then the display of additional item information is enabled 421 in response to the request for additional item information. Termination of the display of additional item information returns to the display of the multiple item information rather than automatically resume video play. This would be particularly advantageous where multiple item information is displayed as illustrated in FIG. 1C. Alternatively, termination of the display of additional item information automatically resumes video play 431 at the item information request location.

The flow chart of FIG. 4B has been intentionally drafted to disclose a number of possible embodiments. A number of permutations, combinations, substitutions, and/or additions in the specific steps, and recursive functions may be initiated at different points in the process than those illustrated. Further, the detailed disclosure with respect to FIGS. 1A-1F and 4A offer additional elements that may be synergistically, additionally or alternatively, implemented in one of many possible embodiments. For example, in one of the various embodiments enabled herein, an apparatus capable of processing data and instructions executable by a processor; the apparatus, when executing the instructions, performs the steps of: monitoring a play location within a feature-length movie; searching a plurality of segment definitions to identify a segment definition that is responsive to the play location, a segment definition defines, responsive to a depiction of a product placement, a beginning and an ending of a video segment within the feature-length movie; displaying, responsive to an identified segment definition, an indication that item information is available for a product placement being depicted, the displaying of an indication that item information is available is also responsive to a user pre-established indication display frequency preference; receiving, from a user, a request for item information in response to the display of an indication that item information is available; pausing the feature-length movie in response to the request for item information; identifying a request location that is responsive to the request for item information; identifying at least one segment definition that is responsive to the request location or a predetermined play period prior to the request location; displaying item information associated with a segment definition that is responsive to the request location; receiving from the user a request for additional item information relating to a displayed item information; enabling a display of additional item information in response to the request for additional item information, the additional item information comprises product placement purchase information; and resuming, following a termination of a displaying of additional item information, a playing of the feature-length movie at a location that, responsive to a segment definition, precedes the request location.

In a second example, in another of the various embodiments enabled herein, an apparatus capable of processing data and instructions executable by a processor; the apparatus, when executing the instructions, performs the steps of: monitoring a play location within a video; searching a plurality of segment definitions to identify a segment definition that is responsive to the play location, a segment definition defines, responsive to a depiction of an item, a beginning and an ending of a video segment within the video; displaying, responsive to an identified segment definition, an indication that item information is available for an item being depicted; receiving, from a user, a request for item information in response to the display of an indication that item information is available; identifying a request location that is responsive to the request for item information; identifying at least one segment definition that is responsive to the request location; displaying item information associated with a segment definition that is responsive to the request location; receiving from the user a request for additional item information relating to a displayed item information; and enabling a display of additional item information in response to the request for additional item information.

By contrast, in another of the various embodiments enabled herein, an apparatus capable of processing data and instructions executable by a processor; the apparatus, when executing the instructions, performs the steps of: monitoring a play location within a video; searching item location information to identify an item whose depiction within the video is responsive to the request location; displaying, responsive to an identified item, an indication that item information is available for an item being depicted; receiving, from a user, a request for item information in response to the display of an indication that item information is available; identifying a request location that is responsive to the request for item information; identifying at least one item that is responsive to the request location; and displaying item information associated with the at least one item that is responsive to the request location.

The creation of item data to support the item notification and identification routines comprises: (i) defining a plurality of segments within a video responsive to the depiction of one or more significant or noteworthy items, e.g., a product placement; (ii) identifying items that are present in the defined segments, e.g., creating textual identifying information; (iii) associating, with identified items, a reference to a visual image identifying the item that is the subject of a defined segment, preferably a video frame from within the video comprising a close-up shot of the subject item; (iv) associating additional item information references with identified items; and (v) creating a video map comprising the segment definitions, identifications, and references. In one such embodiment, the video is a full length theatrically released motion picture, the video map enables the identification of various items that may be depicted in individual segments within the video.

A visual image of a depicted item is any image or representation in image form, irrespective of the source, motion, quality, or relative size. A reference is any means that enables retrieving the image or information. A reference comprises, for example a direction, pointer, instructions, location to a source: within the video, associated with the video, external to the video, remote to the video, or unrelated to the video. In a preferred embodiment, the reference to a visual depiction of an item comprises a time code (e.g., HH:MM:SS:FF) to a location within the video from which a depiction of the item may be extracted. Alternatively, for example, the reference to a visual depiction of an item comprises a link to an image available at a website or webpage.

Item data may be provided by a variety of data formats. An item video map comprises, for example, a combination, arrangement, table, listing, tables and fields, database, metadata, or xml file, or other data relating to item information. Means for storing item data comprise, for example, a text or flat file, an xml document, and/or fields and tables in a database. A preferred embodiment is not dependent on any particular specifications, data formats, or corresponding data routines.

The creation of a video map supporting the item notification and identification routines may be guided by written guidelines and data formats ("specifications") that facilitate standardizing the methodology implemented in defining segments and assigning descriptors. Use of the specifications enhances the effectiveness of the item notification and identification routines. In a preferred embodiment, the creation of segments definitions is executed by a trained specialist ("mapper") guided by the specifications to create consistently elegant definitions of segments and identification of items. A mapper has the advantage, over currently feasible automated systems, of being capable of providing qualitative differentiation (e.g., focus on noteworthy items) and the capability to research external sources of information.

Mapping a video need not be the product of one or more specialists, a preferred embodiment may implement a community supported methodology. Enhancing the richness of the mapping of segment while retaining a consistent and efficient coding may be accomplished by managing the contributions by a community supported methodology. The advantage of a community supported methodology is the potential to maximize the number of items that are correctly identified. In a community supported methodology, a user with specific expertise in a motion picture may contribute to the identification of an item. This contribution may be internally reviewed by a mapper or quality control supervisor, and/or be externally reviewed by the user community. Adherence to the requirements of the specification and data formats promotes the effectiveness of the architecture. The online encyclopedia "Wikipedia" provides one of a number of community supported methodologies that serve as a production model. End user contribution may be encouraged by the dynamics of its economic model. Additionally or alternatively, end user contribution is directly compensated by, for example, monetary payments, or indirectly compensated by, for example, the issuance of video content access minute credits in proportion to the value of the amount of the contribution.

Figure 5:
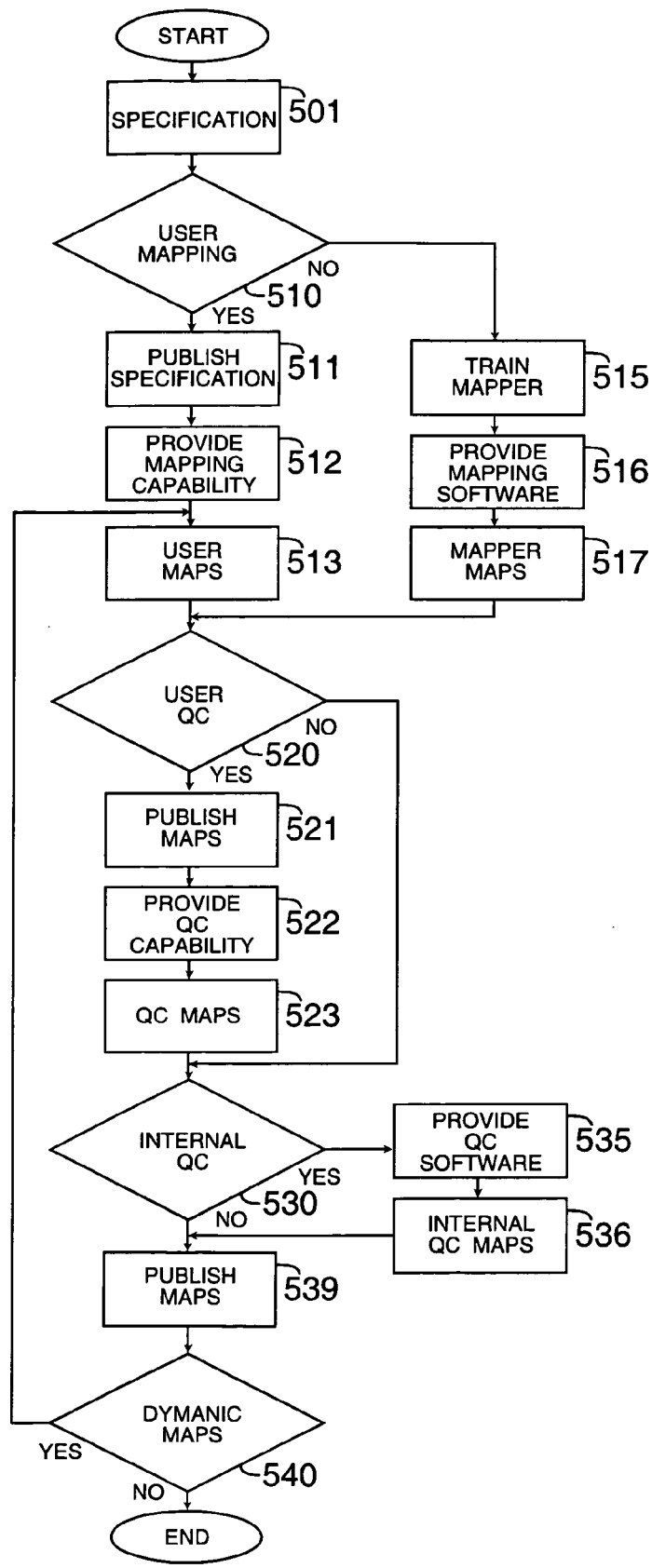
FIG. 5 is a flow chart of a method for creating a video map.

FIG. 5 is a flow chart of method for creating a video map. In those embodiments, where a map creation process comprises the use of specifications, a video map production methodology comprises steps of drafting a specifications 501 and publishing, internally and/or externally, the specifications 511. If a user collaborative methodology is implemented 510 alone or in combination with other methodologies, then it is advantageous to publicly publish the specifications 511. Alternatively, no specification is provided, and the user collaborative methodology is left to directly or indirectly develop its own specifications. Alternatively, in cooperation with such collaborative methodology, exemplary video maps may be published to serve as the specification to enable the community to proceed with video map production.

In a collaborative implementation of a preferred embodiment, the user community may be provided with mapping capability, e.g., software, 512 that facilitates the drafting of maps by users 513. Alternatively, or in cooperative combination with such collaborative methodology, e.g., trained mappers 515 which have specialized mapping software 516, can create draft video maps 517. If neither the users 520 nor an internal staff performs quality control ("QC") 530, then the video maps produced by either the users 513 or the mappers 517 are published to end users 539 for use. If, as in other collaborative methodologies, users here also provide quality control 520, then work product of the users and/or the mappers, as appropriate is published 521 for purposes of quality control.

Users are provided with quality control capability 522 that enables them to provide quality control for video maps 523. Alternatively, or in cooperative combination with such collaborative methodology 530, mappers perform, with the aid of quality control training, software, and systems 535, an independent or dependent quality control of the video maps 536. Video maps that have undergone quality control at the external user level 523 or at the internal mapper level 536 are in due course published 539 for use by the end users. Published video maps 539 need not remain static, instead, advantageously, video maps after they are published, and while substantially completed, are viewed as work in progress 540. This would enable the end users and/or mappers to enhance video maps over time.

Notwithstanding the particular disclosure with respect to FIG. 5, a particular video map production embodiment need not produce all of the definitions and descriptors required to support all of the features detailed herein or incorporated herein by reference, and a video map need not be responsive to any specification and/or data format. As described above, a video map need only consist of information directly or indirectly identifying a beginning and ending of one or more segments, and one or more descriptors that may be necessary to support the item notification and identification routines. Thus, in certain embodiments, the steps of drafting a specification 501 and publishing the specifications 511, among other steps, may be omitted. Further, a particular set of steps of the video map production methodology may be used for one feature, e.g., the item notification routines, and a different set of steps of the video map production methodology may be used for a different feature, e.g., the item identification routines.

The flow chart of FIG. 5 is intentionally drafted to highlight the principal objects of a map creation methodology. As is above detailed, a number of permutations, combinations, and substitutions in the specific steps are possible. Further, recursive functions may be initiated at different points in the process than those illustrated. Still further, while for purposes of illustration terms such "user", "mapper, "capability", "software", "internal" and "external" are utilized to suggest useful distinctions, clearly a user that produces a video map is a mapper, and such user may use software and/or other capabilities to collaborate in the drafting of, or in the quality control of, a video map.

Preferred embodiments of the various inventive elements disclosed herein utilize a multisource receiver transmitter multimedia player comprising synergistically integrated random access and communications capabilities. The multimedia player comprises the various functions, capabilities and components of a variety of consumer electronic systems including, for example, an optical player and a gaming system, e.g., Sony PlayStation 3; a video recorder, e.g., 300-hr TiVo® Series3™ HD Digital Media Recorder; a set-top box capable of retrieving video-on-demand services from a remote video services provider, e.g., a Scientific Atlanta Explorer 8000; a multimedia computing device, e.g., Gateway FX530XM; and a full-featured editing system, e.g., Avid Xpress Pro. The teachings of such devices are incorporated herein by reference.

A multimedia player permits a user to obtain videos, multimedia, and other services from storage means within the multimedia player, sources locally accessible, and/or from a remote services provider. Additionally, the multimedia player, as per the various inventions detailed herein, comprises the means and operational methods of, for example, (i) customizing a playing of a motion picture stored in an optical readable disc; (ii) time shifting and customizing the playing of a motion picture obtained from, for example, a DBS transmission; (iii) integrating communications (e.g. phone answering) with a playing (e.g. auto-replay) of a motion picture; and (iv) auto-configuring a host multimedia player.

Figure 6:
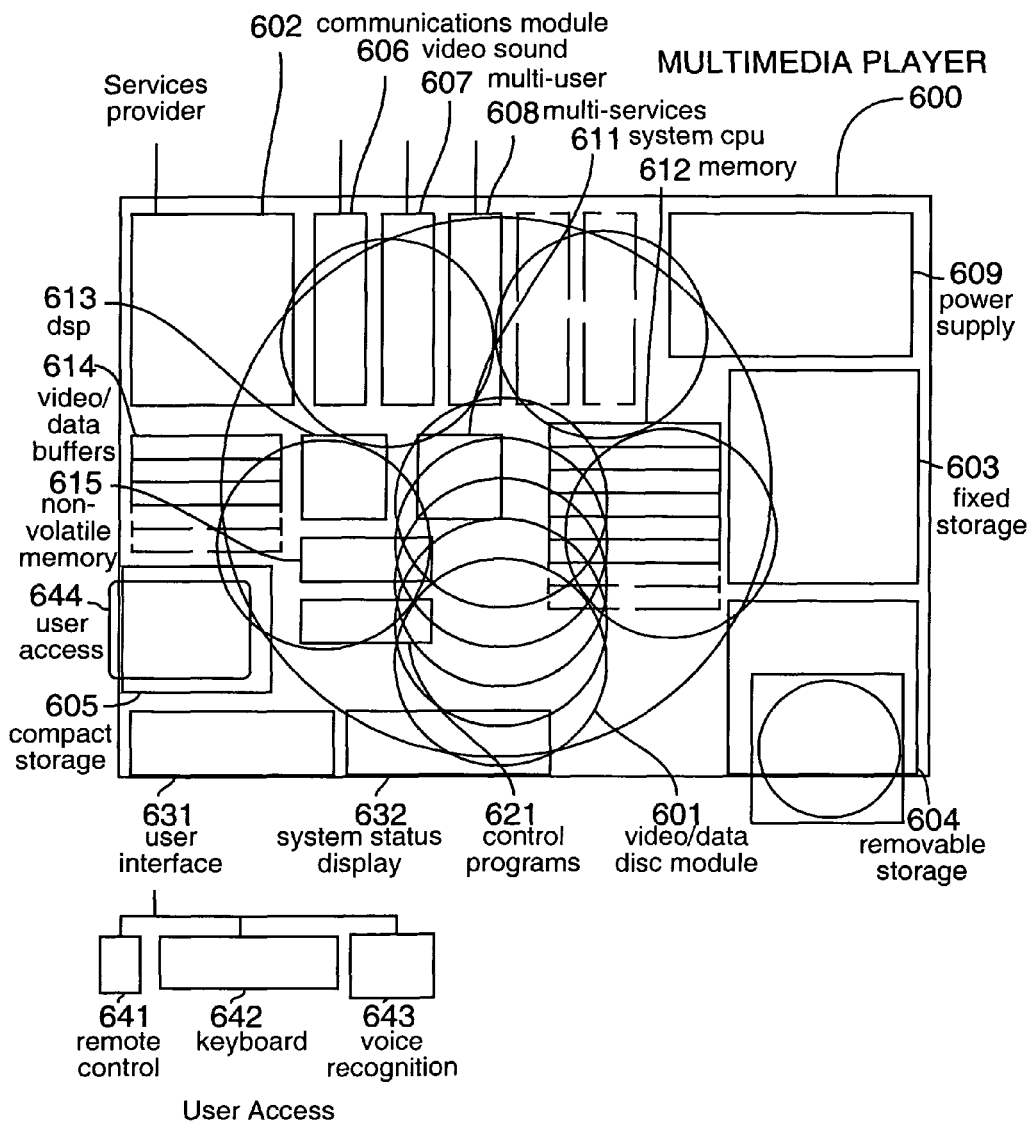
FIG. 6 is a schematic diagram of a multi-featured multimedia player.

FIG. 6 is a schematic diagram of a multi-featured multimedia player 600 comprising the following primary modules and subsystems: i) random access video/data disc module (e.g. a multi-disc optical read/write drive) 601; ii) communications module 602; iii) fixed storage subsystem 603; iv) removable storage subsystem 604; v) compact portable storage subsystem 605; vi) external video/audio input/output support module 606; vii) multi-user modules 607; and viii) multi-services modules 608.

Preferably, a full featured multimedia player "plays" a variety of laser readable media, such as, Blu-rays, DVDs, CDs, photo CDs, and interactive videos and games, in a conventional manner. The wide range of video/data discs that may be accommodated and the various configurations are diagrammatically emphasized in FIG. 6 as the five stacked circles and the five circles inside the representation of the video/data disc unit 601.

The communications module 602 may be as simple as a modem card or device, or as sophisticated as may be required by a direct fiber optic access to a remote video and communication services provider. The communications module may support a plurality and variety of wired and wireless connections to access a variety of networks. Additionally, the communications module may support a plurality of competing broadcasts and on-demand video delivery systems. In this fashion by merely depressing the appropriate keys in a remote control device a user can easily switch between off the air transmissions and on-line services. By this method a video services provider can satisfy a wide range of video requirements without necessarily utilizing video-on-demand system capacity. In such instances a multimedia player may be connected to a local receiving means. The receiving means may be, for a example, an indoor antenna, an outdoor antenna, an existing system, such as the electrical system, that may serve as an antenna, or a local media server.

The fixed memory subsystem 603 refers to any nonvolatile memory storage device principally utilized to randomly read/write and store significant quantities of information. An example of a fixed memory storage subsystem is a personal computer's hard disk drive.

The removable memory subsystem 604 refers to any nonvolatile memory storage device principally utilized to transport information to and from two similarly equipped devices. Examples of removable memory storage subsystems are electronic memories and removable hard disks. Electronic memories comprise, for example, USB flash drives. The random access disc module 601 is another example of a removable storage subsystem.

The compact portable storage subsystem 605 and user access media 644 is principally distinguished from a removable storage subsystem 604 by the size of the media and the greater variety of memory storage technologies that are generally implemented. Nonetheless, some of the removable storage media, such as for example a flash drive, are also considered user access media 644. Examples of other removable storage media and user access media are: laser read/write cards, in which at least one surface of the card permits a laser to read/write information; electronic cards, in which the information is stored in electronic components; magnetic cards and drives embodying magnetic storage technology, electronic memories and cartridges.

Clearly, a variety of memory devices are available utilizing technologies and combinations of technologies to suit particular performance requirements. The above classifications of the memory devices are directed at bringing attention to functional capabilities of a multimedia player rather than to a particular technology. The classifications are not intended to restrict a subsystem to a particular classification, limit the selection of subsystems which may be implemented, or to limit the function of the particular subsystem implemented.

The external video/audio input/output support module 606 supports video/audio/data transmission to the primary video display system comprising, for example, a monitor/television, stereo system, and keyboard/voice recognition-response. Additionally, the input/output module supports video/audio input from local sources such as for example video cameras, and videophones. The construction of the external support module follows the conventional practices of consumer electronic products as for example: optical disc players, recorders, and personal computers.

Multi-user modules 607 principally support separate controlled independent access by other users of the multimedia player's processing, video, and communications resources.

The construction of multi-user modules following established networking technologies.

In a preferred embodiment, instead of utilizing one of the Windows operating systems, the multimedia player will incorporate a small footprint multi-user multitasking real-time operating system with a streamlined user interface patterned after, for example, the simpler interface of a cable receiver. A multi-layer approach to the functionality/complexity of such functions as surfing the net; contact management and email, optical disc/internet hybrid games, applications and services; video editing; multimedia and word processing; and portfolio management and banking, are made available at a streamlined level that provides functionality required by most users at a markedly reduced level of complexity.

Multi-services modules 608 provide a host of services, such as for example residential security, and appliance operation management. The operation of the module being principally a software application running under the multi-user operating system implemented. The construction of the particular multi-service module is responsive to the particular application.

The multimedia player further comprises computing elements and video processing elements readily found in multi-media devices and video electronic systems such as, for example, and not limitation, microprocessor 611, memory units 612, video processor or digital signal processor 613, video, audio, and data buffers 614, and nonvolatile memory 615. The video audio module or board 606 and the video processor 613 comprise compression-decompression technologies to both retrieve and decompress videos and compress and transmit videos. The compression technologies may include hardware, firmware, software, or any combination of these. One or a plurality of existing and forthcoming video compression methods may be implemented such as: Motion-JPEG, MPEG 1, MPEG 2, Fractals, Wavelets, and MPEG 4.

A multimedia player's control programs that manage the multimedia player's resources, and the retrieval and processing of data and video information, reside in dedicated chips 621. Alternatively, or additionally, control programs are stored in mass memory devices 603 from installed or downloaded software, in removable memory media 604, or in a user access media 644.

A multimedia player's user control interface 631 includes communications to the buttons and keys located on the cabinet of the device, and to the associated control devices 641-642-643. The keys, buttons, and switches, conventionally found in consumer electronic systems and deemed advantageous to the operation of the multimedia player may also be implemented. These controls are further augmented by a plurality of function comprising: segment skipping control, magnification controls, content preferences control, video map control, and system menu control. The user control interface 631 additionally supports infrared and/or RF remote control units 641, e.g., numeric control pad, keyboard with a touchpad, and game controller; wire connected control units 642, e.g., cable connected computer keyboard, mouse, and game controller; a voice recognition unit 643; and touch screen capability. A remote control 641 may also include any device, such as a smart phone or pad, that may be synergistically integrated to support functions and features disclosed and/or incorporated herein by reference.

The keyboard, similar to a personal computer implementation, facilitates system setup, keyword retrieval, and system functions requiring the entry of alpha characters. Since a preferred configuration of a multimedia player comprises significant multimedia capabilities, a keyboard pointing means is advantageous. A keyboard connector used to connect a standard AT keyboard or a dedicated keyboard is supplied. Alternatively, an infrared-based or radio-based keyboard is implemented. Further, given the computing and storage capabilities of multimedia player, a voice response subsystem option accommodating at least the few commands, such as play, stop, mute, audio, skip, required to control the basic operations can additionally be provided. The sophistication of the voice recognition capability can be enhanced as the hardware/software configuration of the multimedia player advances within mass market price points.

Implemented in the multimedia player is a digital system status display subsystem 632, which provides visual feedback and system status information similar to the implementations in video playing devices.

In general, parts, subassemblies, and components of a multimedia player are of conventional characteristics and are freely substituted by like functioning elements and components. For example, and not limitation, while fiber optic-based communications are preferred, copper phone lines and coaxial cable-based communications are considered less capable functional equivalents. Additionally, a certain degree of redundancy of components is illustrated in FIG. 6 to schematically show and detail significant functions.

Clearly, redundant components, in general, and redundant electronic components, in particular, are intended to be eliminated in a preferred embodiment. For example, while a multimedia player may include a removable memory subsystem and a compact memory subsystem, one may be the functional equivalent of the other, and one or the other may be eliminated. In general, where cost effective, components are designed to serve a combination of functions.

Further, the configuration of the multimedia player's various modules, components, and subsystems, are intended to offer flexibility analogous to that found in a personal computer. Specifically with respect to the multi-user capabilities, a multimedia player may be configured, for example, with more than one optical module, whether inside the primary cabinet or in a mating or sister cabinet. Various embodiments of multimedia players do not include all, or even most, of the means, and/or capabilities detailed herein. The particular configuration of a multimedia player is responsive to the particular functions or features desired.

Responsive to user friendliness, a more advanced wireless plug and play communications and power motherboard and cabinet design is preferred. The motherboard and cabinet would permit the replacement of, for example, the power supply 609 just as easily as a battery is replaced in a portable personal computer. In a preferred embodiment of a multimedia player, every component and subsystem is added or replaced without resorting to screwdrivers and the need to unplug and plug communications and power cables.

Generally, in, for example, an optical disc implementation, the entire variable content video (video/audio and video map) is provided in a format similar to that required by the video images contained in the disc. Specifically, in a DVD implementation, the video map is included in a digital format and the video content is included in a digital compressed format in one or more spiral tracks. A video map may be provided with, or separate from, the video's video and audio data. For example, a DVD may comprise, as part of its manufacturing, a prerecorded video and a corresponding video map whether separate from video frames or interleaved among video frames. In the case of preexisting DVDs, the purchasable item identification data is required to be provided by a source other than the DVD. Clearly, the playing of a DVD is not technically limited to the manner prescribed by the widely accepted DVD specifications.

Alternatively, the video map and other data may be separately provided by a removable memory media, an user access media, or downloaded by means of the communications interface. For example, a multimedia player simply configured and comprising, a DVD drive and a flash drive or modem provides editing and retrieval benefits for DVDs storing a conventional linear video. Additionally, the drive may serve to store a user's generalized or video specific video content preferences. Conventional linear video programs provide a library of motion pictures to which the teachings herein may be applied.

In those instances where the authoring of the video did not include the production of a video map, the map may be retrieved from a source (e.g., a web site) other than the source of the video (e.g., an optical drive or a remote video provider). In this embodiment, a video map, user interface and other control programs particular to the motion picture may be downloaded by the internet from a remote map server or other multimedia player. Upon a playing of a video, the control program causes the reading of the video's identifier from the video source 601, searches the mass memory fixed storage device 603 for a video map and if not available communicates with an external source to download the appropriate map.

With respect to control programs, scheduling routines, user preferences, video map, and other principally software elements, it is noted that these may be separately or jointly stored in any one of a multimedia player's various firmware/hardware memory devices. For example, the user's content preferences are stored in nonvolatile resident memory 615, in the memory of the fixed or removable memory subsystem 603/604, a user's optical read/write access card or electronic memory card 644, or from the respective read/write video/data disc 601. In an interactive video game application, data, in general, and game software, in particular, for example, may be downloaded to the hard disk, reserving subsequent access of the optical disc for video/audio retrieval. A multimedia player's processing of the control programs 621 is principally a function of the system CPU 611 and system RAM 612.

A variable content video, segment information, play routines specific to the video, and control codes for automatically configuring or controlling the functions of the multimedia player may be provided by means of a variety of existing and evolving technologies. In addition to the hard formats such as tape, optical disc, optical/magnetic disk, memory chips and modules (e.g. RAM, DRAM, high capacity flash memory, bubble memory); a video may be provided by soft formats such as may be implemented in a variety of communications networks utilizing for example analog or digital cable transmissions, fiber optic transmission, phone and satellite communications. A multimedia player need not be physically accessible by a user or be physically located near a display device or a television set. The multimedia player may provide a user access to remote video resources and may itself be remotely controlled by the user. Fiber optic and coaxial communications easily permit the required transfer rates over long distances between controllers, multimedia players, other video sources and displays.

It is within a network-based implementation, that the various advantages and capabilities of the preferred embodiments are realized with respect to the specific hardware technologies and architectures of an underlying video delivery system.

Figure 7:
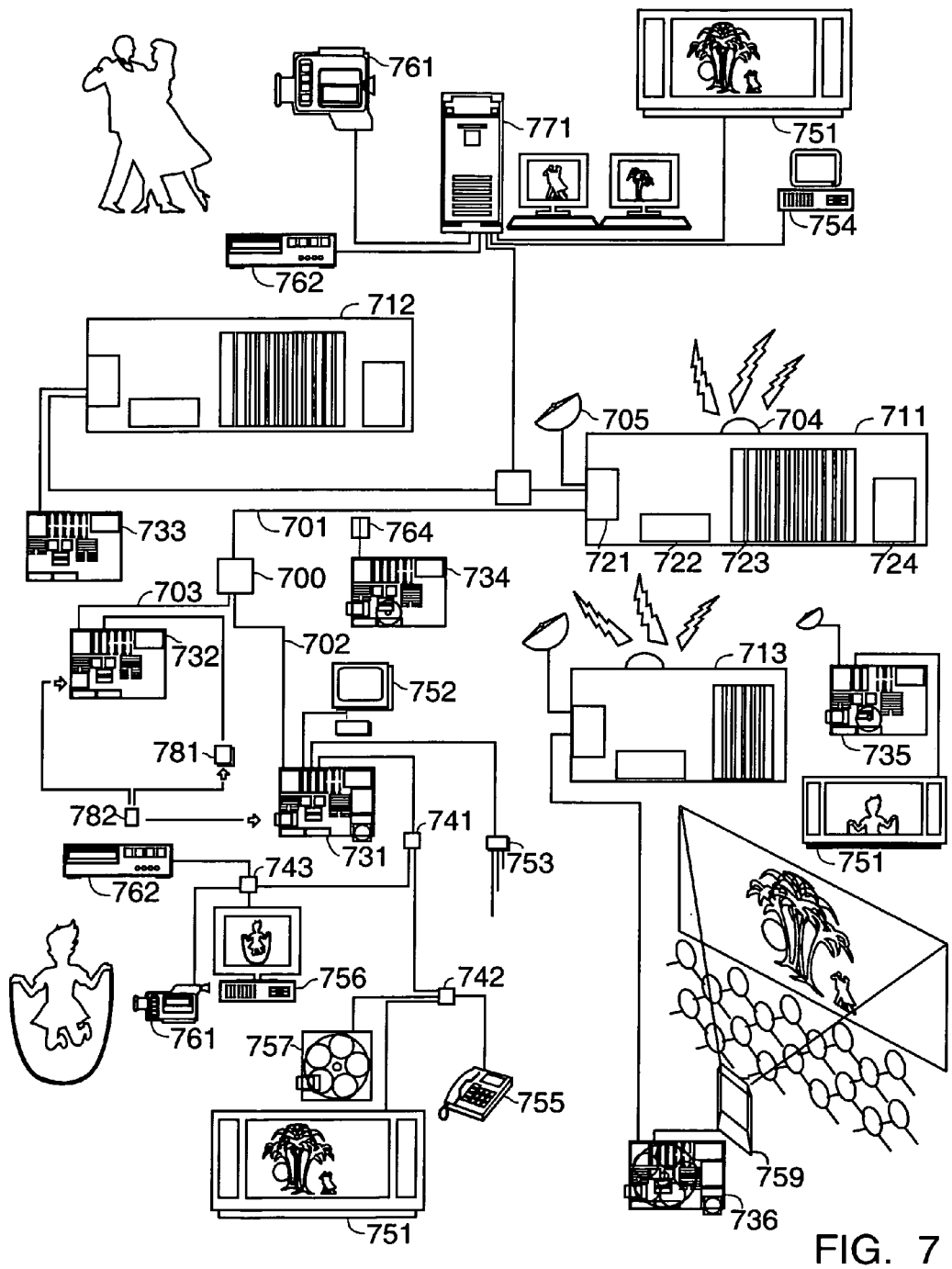
FIG. 7 is a schematic diagram of a video provider and end user network architecture.

FIG. 7 is a schematic diagram of a video provider and end user network architecture in which participants in the network 700 comprise any number of video providers 711-713, and any number of end users 731-736. Participants in the network 700, however, whether classified as video providers 711-713 or end users 731-736 are both providers and end users of video services. Analogous to a communications network, each participant is able to retrieve and transmit video/data from any other participant. An example is the "YouTube" online video streaming service that allows users to view and share videos that have been uploaded by other users.

A video-on-demand system, in general, a content-on-demand system, the delivery of variable content video services, and the delivery of video maps in particular, are herein intended to be deployable by a variety of possible networks and multimedia player configurations. FIG. 7 suggests a plurality of network infrastructures that may be implemented. Shown are wired and non-wired video transmission infrastructures based on, for example, the use of one or a hybrid combination of the following: fiber optic 701, coaxial cable 702, twisted copper wire 703, microwave, radio WIFI, or Bluetooth 704, and satellite 705.

Each participant in the network obtains a hardware configuration consistent with their desire and objectives, and their financial resources. The video system of a participant who wishes to serve as a video provider 711-713 is functionally equivalent to the multimedia player device previously detailed with respect to FIG. 6, differing only in that the respective resources are appropriately scaled and modified to simultaneously access a variety of videos, and service a number of end users. Both an end user's multimedia player 731 and a nonlinear editing system 771 are in fact video servers. A video server of a video services provider is distinguished principally by the significantly greater video storage capacity and the number of video streams it can service.

A video provider system, for example 711, comprises: i) communications technologies 721 for establishing a plurality of video and communications streams to a plurality of multimedia players 731-736 to enable the uploading and/or downloading of information, data and/or video content, such as segments and videos; ii) processing hardware and software 722 for retrieving from a multimedia player an end user's video preferences, content preferences, search terms and search requests, and for processing the user's video preferences, content preferences, search terms and search requests. e.g., performing searches of segment data to identify the segments or list of segments responsive to a users search terms and search requests; iii) mass storage random access memory devices 723 for storing and retrieving video maps (e.g., segment data), and/or a videobase comprising a plurality of any combination of video segments, motion pictures, conventional programs, interactive games and services, and variable content videos; and iv) processing hardware and software 724 for maintaining accounting and support services in connection with video services provided.

Simply stated, a variable content video provider system 711-713 comprises a video server and the video server software being enhanced to deliver variable content video services.

Video providers may be further categorized according to the functions served and/or the extent and character of the data and videobase maintained. Central video services providers 711 may be capable of providing a greater variety of video services than for example regional or local services providers 713. Regional or local services providers 713, however may be the source of local interest video services such as are currently broadcast by local television stations. Other video services providers 712 may act as "libraries" for specialized categories of videos, as for example an historical video archive of government proceedings; or services as for example electronics shopping. The internet architecture and the different classes of web sites is suggestive of the wide range of multimedia configurations that are possible.

A user's access to the resources of a video services provider 711-713 need not be direct. A requested video may be downloaded, in real time or non-real-time, to a services provider that may be more economically accessible to the intended user. Within the network, some video services provider may not directly provide any services to users, but act as centralized video originators or depositories for other services providers.

The video server's mass storage random access memory devices 723 for storing a plurality of variable content videos may advantageously implement a multiple-read/write head architecture. This would also facilitate the simultaneous retrieval of several versions of a video from a single video source to satisfy simultaneously the particular viewing requirements of several end users. A multiple-read-head architecture reduces, for example, the number of copies of a video that the on-line video server may need to store.

In this context it is also noted that the mass storage devices may additionally implement stripping methods to store a video across several storage devices. Where cost effective, a variable content video may be entirely or partially stored in RAM.

The particular configuration of a end user's multimedia player's random access, storage, memory, processing, and communication means and capabilities are responsive to, but are not necessarily limited by, the minimum requirements of, for example, a particular service provider. A multimedia player configuration, such as detailed with respect to FIG. 6, provides the required video accessing and storage, processing, and communications architecture required by a network-based remote video services provider.

The multimedia player's multi-user and multi-services modules support separate controlled independent access by a plurality of users of the multimedia player's processing, video, and communications resources. In addition to the primary video display system 751 supported by a multimedia player 731, the multi-user module and multi-services module installed also provides services to a monitor/keyboard 752, security system 753, personal multimedia computer 756, voice and/or video/voice telephones 755. In this fashion a multimedia player acts an intermediate services provider.

The particular location of the multimedia player, subsystems, or components, whether within the immediate boundaries of a residence, automobile, or the particular location of the end user, are not limited herein to any particular arrangement. A variety of configurations are possible to meet the various needs at any particular time of the end user. In a preferred embodiment a multimedia player is similar in size and weigh to a super thin portable notebook computer. This permits a user to have available all of the functions herein detailed irrespective of the user's particular location at any moment in time.

In commercial applications, such as a theater, a multimedia player 736 may support a high definition projector 759. For illustration purposes, connections between multimedia players and output devices are shown with lines. However, communications may be established by any of a variety of wired or wireless means. Thus, a multimedia player 731 need not be directly or indirectly connected by wire to the devices 751-759, 561-562. Further, devices 751-759, 761-762 may be connected to a communications port 741-743 which is in communications with the multimedia player 731. The communications port may be of varying degrees of intelligence and capabilities, it may serve to boost or manage the signal, or have no other purpose than to serve as a convenient outlet in which to plug and unplug devices.

In an embodiment as shown in FIG. 7, a location will be "wired" or "networked" to enable a self configuring multimedia player to identify and establish a communications with other devices in the network.

Additionally, multimedia player modules may themselves be physically distributed over the network. The plug and play of modules across a network architecture permits, for example, that the video disc module be physically remote from a multimedia player's 731 main unit and plugged on a port 742 near the television 751. In this instance, the case 757 housing the video disc module also houses a compact storage module. Thus, a single video disc module can be easily moved from one location 742 to another location 743 when physical proximity is required to conveniently replace discs. It is noted that while the disc module case 757 is connected to a first port 742, it would be remotely accessible to a terminal 756 plugged into a second port 743.

FIG. 7 also shows, for example, the use of a separate compact portable storage subsystem 781 and a user access media 782 to physically transport user data, video map, and/or video between multimedia players 731-732.

A multimedia player's core components may be located anywhere inside or outside the location. Specially, where a multimedia player includes fans and disk drives, the top of the TV set would not be an ideal location.

As detailed previously, the user's control of a multimedia player is either through an infrared control keypad, wired or infrared alphanumeric control keyboard, voice control, or system controls directly on the multimedia player. These controls may be directly incorporated in the devices accessing the multimedia player such as a TV.

The novel combination of an external fiber optic based communications module and a multiple read/write storage module, provides a multimedia player configuration capable of efficiently downloading significant amounts of full motion video to be viewed, played with, or processed at the end user's leisure. In such a multimedia player, the downloading of, for example, a feature length motion picture, an interactive video game, or a series of lectures can be achieved with unprecedented speed.

As suggested earlier, an object of FIG. 7 is to convey the concept that an end user's multimedia player 731-736 and an editing system 771 can both upload and download video and video maps through the network directly to other end users 731-736, editing systems 771, and/or to the video servers of videos services providers 711-713.

A multimedia player may be configured to duplicate the functions of a nonlinear editing system as previously detailed. Both the multimedia player 731 and the editing system 771 are capable of receiving input from other sources such as a digital video camera 761 and video recorder 762. As is the case with multimedia player 731, the editing system 771 is capable of outputting video to, for example, a TV 751 and to a PC 754.

As indicated previously, a multimedia player can accommodate a plurality of compression and decompression technologies to both retrieve and decompress videos and compress and transmit videos through the network. Preferably, a specific video originating at a digital camera 761, downloaded to a nonlinear editing system 771, transmitted over the network 700 to a video server for retransmission over the network 700 to a multimedia player 731 will utilize a single compression technology to avoid compounding the effects of artifacts that may be introduced by a particular compression technology. Clearly, where the decompression technology resides completely in software, the video itself could provide the required decompression software.

As indicated above, variable content video services can be delivered by means of any of a number of non-wired based video delivery systems. For example, microwave technologies may provide two way video services including movies-on-demand. The network uses a series of transmitters 704, each of which is capable of broadcasting a digital signal. End users utilize an antenna 764 to receive the signal. The antenna 764 is connected to a decoder connected to a TV set. In an embodiment, a multimedia player 734 performs the processing and decoding functions required for transmission to a video display.

In a preferred embodiment of a cellular-like system, a video provider's cell site 713 comprises microwave communications, video server, and processing systems for establishing a plurality of video and communications streams to a plurality of multimedia players 731-736.

A multimedia player's capability to obtain videos from a remote video provider permits an end user to efficiently obtain, from an extensive videobase, a video(s), segment(s) of a video, and/or segment(s) from each of a plurality of videos, to be viewed at the time of the user's choosing, over which the user exercises complete control as to the subject matter, form of expression, and other elements comprising the video. Further, the resulting video need not comprise or result from a single videobase. A video may result from the automated selection of a variety of segments/videos from one or a plurality of videobases.

In a video-on-demand environment, typically users will be expected to request the delivery of specific pre-produced variable content videos. In addition to the other method disclosed herein a video may be obtained by, for example: i) specifying the video's title or code obtained from a reference guide; ii) making a selection from a listing in alphabetical order by title, subject matter, actors, etc.; iii) tree structure of video classifications, for example advertisements, automobiles, 4WD; iv) keyword searching and retrieval; v) specifying preferences for a content level in each of a plurality of content categories; vi) versions, subject, and/or performer preferences; and vii) any combination of these. It is noted that a reference guide may be available in a real-time format compatible with a multimedia player, e.g. retrieved from a Web site.

Once a video is selected, the entire variable content video, including all the non-linear segments and the video map, may be transmitted to the user's multimedia player. When the video map is not downloaded, a video is transmitted that results from the application of the user's video content preferences to the video map of the requested video. That is, a sequence of only those segments that are consistent with a user's content preferences is transmitted. In those instances where the entirety of a variable content video is downloaded, the multimedia player need not store all of the segments, and if all of the segments are stored, they need not all be stored for more than a transitory time, i.e., the time for a user to desire the erasure of undesired content. A video map provides the information to omit the initial storage or to erase, the storage of content of the video. This would be of particular benefit for, for example, a parent downloading an "R" motion picture, and after viewing it, causing the erasure of those segments which are inconsistent with a "PG" version. Or for example, a user causing, for example, only a Romance version, or the results of keyword searches to be saved.

A significant advantage of the partial erasure of content is that storage capacity is freed for a subsequent use. In such instances, the original video maps may be retained; only the relevant data of the video map may be retained separately and/or incorporated within a master video map, data or index of the contents of the storage device.

Alternatively to the downloading a video, the end user remains on-line with the video provider during the transmission of the video and utilizes the hardware resources of the video provider. In an on-line architecture, a multimedia player comprising principally communications capabilities without significant local storage, processing, or memory, is adequate. In such an architecture, a user's content preferences, if not stored in the multimedia player, may be retained by the video provider.

A number of internet based video marketplaces, video sharing, and video delivery systems, methodologies, and embodiments have been implemented. These systems evidence the feasibility of video-on-demand over the internet in addition to video-on-demand over, for example, a TV cable system. The synergistic integration of the capabilities of the video and communications network detailed with respect to FIG. 7, and the capabilities of the multimedia multi-source receiver transmitter player detailed with respect to FIG. 6, enable the retrieval, of downloading and sharing of video across a variety of networks implementing a number of methodologies, including an internet based downloading and uploading of video.

A significant contribution intended by the present disclosure is to further advance the benefits of providing to consumers the synergistic inclusion of a video map with the visual and audio components of a video, and to further advance the potential of a variable content video.

The teachings disclosed herein, directly and indirectly by, for example, incorporation, are intended to show a variety of architectures, services, capabilities, systems, methods, and inventive elements which are combined and may be combined to suit particular embodiments. The synergies among and between the various inventive elements is a significant feature of the disclosures herein. The various examples included herein demonstrate that it is intended, and deemed advantageous, that each of the methods detailed herein benefit from the teachings presented with other methods detailed herein and/or incorporated by reference.

Further, it is the intent of incorporation to derive the full benefits, as an addition or an alternative, of the logical integration of the teachings herein with the teachings of the references cited. The incorporation by reference at a specific place within the specification is not intended to limit the extent to which the reference is incorporated, or the manner in which it may be integrated.

Where a teaching may be deemed to be at cross purposes, or otherwise incompatible, with some other teaching, it ought to be understood as a possible alternative to be utilized as a particular preferred embodiment may require. Clearly, it may be neither advantageous nor practical for all the elements or a particular combination of elements to be implemented in a single embodiment.

While elements of the inventions have been detailed in conjunction with specific embodiments thereof, it is evident that many alternatives, modifications and variations are possible and will be apparent to those skilled in the art in light of the foregoing description. Accordingly, it is intended to embrace all such alternatives, modifications, variations, and combinations as fall within the spirit and broad scope of the specification.

While the title, abstract, and claims initially presented are drawn to particular inventive elements, it is intended that other inventive elements disclosed herein will be the subject of their own corresponding claims.

The teachings that have been cited and incorporated herein are offered by way of example, and not limitation, of the underlying foundation of knowledge and skill that is available. Many of the features, components, and methods found in the art may be incorporated, as suggested herein, in a preferred embodiment; and since other modifications and changes varied to fit particular requirements and environments will be apparent to those skilled in the art, the inventions are not limited to the embodiments set forth or suggested herein. It is to be understood that the inventions are not limited thereby. It is also to be understood that the specific details shown are merely illustrative, and that the inventions may be carried out in other ways without departing from the broad spirit and scope of the specification.

What is claimed is:

1. An apparatus capable of processing data and instructions executable by
   a processor; the apparatus, when executing the instructions, performs the steps of:
   receiving, from a user during a playing of a video, a request for information relating to a depiction within the video;
   pausing the playing in response to the request for information;
   identifying a request location that is responsive to the request for information;
   retrieving, from a plurality of video frame identifiers, a first video frame identifier that is responsive to the request location, and contemporaneously retrieving a second video frame identifier that is different from the first video frame identifier and that is responsive to a location that is prior to the request location;
   displaying information associated with the first video frame identifier, and contemporaneously displaying information associated with the second video frame identifier that is different from the information associated with the first video frame identifier;
   receiving from the user a request for additional information relating to the information associated with the second video frame identifier;
   enabling a displaying of additional information in response to the request for additional information; and
   resuming the playing at a location that precedes the request location and that is responsive to an amount of time that the playing has been paused.

2. An apparatus capable of processing data and instructions executable by a processor; the apparatus, when executing the instructions, performs the steps of:
   receiving, from a user during a playing of a video, a request for information relating to a depiction within the video;
   identifying a request location that is responsive to the request for information;
   retrieving, from a plurality of video frame identifiers, a first video frame identifier that is responsive to the request location, and contemporaneously retrieving a second video frame identifier that is different from the first video frame identifier and that is responsive to a location that is prior to the request location;
   displaying information associated with the first video frame identifier, and contemporaneously displaying information associated with the second video frame identifier that is different from the information associated with the first video frame identifier;
   receiving from the user a request for additional information relating to the information associated with the second video frame identifier;
   pausing the playing in response to the request for additional information;
   enabling a displaying of additional information in response to the request for additional information; and
   resuming the playing at a location that precedes the request location and that is responsive to an amount of time that the playing has been paused.

3. The apparatus of claim 2, wherein the request for information is responsive to a display of an indication that information is available.

4. An apparatus capable of processing data and instructions executable by a processor; the apparatus, when executing the instructions, performs the steps of:
   receiving, from a user during a playing of a video, a request for information relating to a depiction within the video;
   identifying a request location that is responsive to the request for information;
   retrieving, from a plurality of video frame identifiers, a first video frame identifier that is responsive to the request location, and contemporaneously retrieving a second video frame identifier that is different from the first video frame identifier and that is responsive to a location that is prior to the request location; and
   displaying information associated with the first video frame identifier, and contemporaneously displaying information associated with the second video frame identifier that is different from the information associated with the first video frame identifier.

5. The apparatus of claim 4, wherein the request for information is responsive to a display of an indication that information is available.

6. The apparatus of claim 4, wherein the apparatus further performs the steps of:
   receiving from the user a request for additional information relating to the information associated with the first video frame identifier; and
   pausing the playing in response to a request for additional information;
   enabling a displaying of additional information in response to the request for additional information; and
   resuming the playing at a location that precedes the request location and that is responsive to an amount of time that the playing has been paused.

7. An apparatus capable of processing data and instructions executable by a processor; the apparatus, when executing the instructions, performs the steps of:
   receiving, from a user during a playing of a video, a request for information relating to a depiction within the video;
   pausing the playing in response to the request for information;
   identifying a request location that is responsive to the request for information;
   retrieving, from a plurality of video frame identifiers, a first video frame identifier that is responsive to the request location, and contemporaneously retrieving a second video frame identifier that is different from the first video frame identifier and that is responsive to a location that is prior to the request location;
   displaying information associated with the first video frame identifier, and contemporaneously displaying information associated with the second video frame identifier that is different from the information associated with the first video frame identifier;
   receiving from the user a request for additional information relating to the information associated with the first video frame identifier;
   enabling a displaying of additional information in response to the request for additional information; and resuming the playing at a beginning of a video clip that is responsive to the request location.

8. An apparatus capable of processing data and instructions executable by a processor; the apparatus, when executing the instructions, performs the steps of:
   receiving, from a user during a playing of a video, a request for information relating to a depiction within the video;
   identifying a request location that is responsive to the request for information;
   retrieving, from a plurality of video frame identifiers, a first video frame identifier that is responsive to the request location, and contemporaneously retrieving a second video frame identifier that is different from the first video frame identifier and that is responsive to a location that is prior to the request location;
   displaying information associated with the first video frame identifier, and contemporaneously displaying information associated with the second video frame identifier that is different from the information associated with the first video frame identifier.
   receiving from the user a request for additional information relating to the information associated with the first video frame identifier;
   pausing the playing in response to the request for additional information;
   enabling a displaying of additional information in response to the request for additional information; and
   resuming the playing at a beginning of a video clip that is responsive to the request location.

9. An apparatus capable of processing data and instructions executable by a processor; the apparatus, when executing the instructions, performs the steps of:
   receiving, from a user during a playing of a video, a request for information relating to a depiction within the video;
   identifying a request location that is responsive to the request for information;
   retrieving, from a plurality of video frame identifiers, a first video frame identifier that is responsive to the request location, and contemporaneously retrieving a second video frame identifier that is different from the first video frame identifier and that is responsive to a location that is prior to the request location;
   displaying information associated with the first video frame identifier, and contemporaneously displaying information associated with the second video frame identifier that is different from the information associated with the first video frame identifier;
   receiving from the user a request for additional information relating to the information associated with the first video frame identifier; and
   enabling a displaying of additional information in response to the request for additional information.

10. The apparatus of claim 9, wherein the request for information is responsive to a display of an indication that information is available.

11. The apparatus of claim 9, wherein the displaying of information associated the first video frame identifier comprises displaying a first image extracted from within the video, and wherein the displaying information associated with the second video frame identifier comprises displaying a second image extracted from within the video.

12. The apparatus of claim 9, wherein the apparatus further performs the step of:
   pausing the playing in response to the request for information.

13. The apparatus of claim 9, wherein the apparatus further performs the steps of:
   pausing the playing in response to the request for additional information; and
   resuming the playing at a location that precedes the request location and that is responsive to an amount of time that the playing has been paused.

14. An apparatus capable of processing data and instructions executable by a processor; the apparatus, when executing the instructions, performs the steps of:
   receiving, from a user during a playing of a video, a request for information relating to a depiction within the video;
   identifying a request location that is responsive to the request for information;
   retrieving, from a plurality of video frame identifiers, a first video frame identifier that is responsive to the request location, and contemporaneously retrieving a second video frame identifier that is different from the first video frame identifier and that is responsive to a location that is prior to the request location; and
   displaying information associated with the first video frame identifier, and contemporaneously displaying information associated with the second video frame identifier that is different from the information associated with the first video frame identifier.

15. The apparatus of claim 14, wherein the request for information is responsive to a display of an indication that information is available.

16. An apparatus capable of processing data and instructions executable by a processor; the apparatus, when executing the instructions, performs the steps of:
   receiving, from a user during a playing of a video, a request for information relating to a depiction within the video;
   identifying a request location that is responsive to the request for information;
   retrieving a first video frame identifier that is responsive to the request location, and contemporaneously retrieving a second video frame identifier that is different from the first video frame identifier and that is responsive to a location that is prior to the request location;
   displaying information associated with the first video frame identifier, and contemporaneously displaying information associated with the second video frame identifier that is different from the information associated with the first video frame identifier;
   receiving from the user a request for additional information relating to the information associated with the second video frame identifier; and
   enabling a displaying of additional information in response to the request for additional information.

17. The apparatus of claim 16, wherein the request for information is responsive to a display of an indication that information is available.

18. The apparatus of claim 16, wherein the apparatus further performs the steps of: pausing the playing in response to the request for additional information; and resuming, following a termination of the displaying of additional information, the playing at a beginning of a video clip that is responsive to the request location.

19. An apparatus capable of processing data and instructions executable by a processor; the apparatus, when executing the instructions, performs the steps of:
   receiving, from a user during a playing of a video, a request for information relating to a depiction within the video;
   identifying a request location that is responsive to the request for information;
   retrieving a first video frame identifier that is responsive to the request location, and contemporaneously retrieving a second video frame identifier that is different from the first video frame identifier and that is responsive to a location that is prior to the request location; and displaying information associated with the first video frame identifier, and contemporaneously displaying information associated with the second video frame identifier that is different from the information associated with the first video frame identifier.

20. The apparatus of claim 19, wherein the request for information is responsive to a display of an indication that information is available.

* * * * *